US007809012B2

(12) United States Patent
Ruuska et al.

(10) Patent No.: US 7,809,012 B2
(45) Date of Patent: Oct. 5, 2010

(54) MANAGING LOW-POWER WIRELESS MEDIUMS IN MULTIRADIO DEVICES

(75) Inventors: Päivi M. Ruuska, Tampere (FI); Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 771 days.

(21) Appl. No.: 11/676,084

(22) Filed: Feb. 16, 2007

(65) Prior Publication Data

US 2008/0200120 A1 Aug. 21, 2008

(51) Int. Cl.
*H04J 3/24* (2006.01)
(52) U.S. Cl. .................. 370/449; 370/277; 370/280; 370/310; 370/345; 370/346; 370/347; 370/348; 370/431; 455/434; 455/435.3
(58) Field of Classification Search .................. 370/449, 370/431, 310, 342, 277, 280, 345, 346, 347, 370/348; 455/574, 41.2, 434, 435.3
See application file for complete search history.

(56) References Cited

U.S. PATENT DOCUMENTS

| 7,215,659 | B1 * | 5/2007 | Chen et al. ................... 370/338 |
| 7,475,148 | B2 * | 1/2009 | Hlasny ........................ 709/227 |
| 7,643,463 | B1 * | 1/2010 | Linsky et al. ................ 370/344 |
| 2002/0136233 | A1 * | 9/2002 | Chen et al. ................... 370/445 |
| 2004/0014464 | A1 | 1/2004 | Takatori et al. |
| 2004/0266494 | A1 * | 12/2004 | Ruuska et al. ............... 455/574 |
| 2005/0239474 | A9 * | 10/2005 | Liang .......................... 455/454 |
| 2009/0270120 | A1 * | 10/2009 | Park ........................... 455/518 |

FOREIGN PATENT DOCUMENTS

| WO | WO0103327 | 1/2001 |
| WO | WO2006120556 | 11/2006 |

OTHER PUBLICATIONS

Bahl, et al "Reconsidering Wireless Systems With Multiple Radios", ACM SIGCOM Computer Communications Review, vol. 34, No. 5, Oct. 2004; Entire Document.
Intellectual Property Office of Singapore Search and Examination Report dated Jul. 1, 2008, for Singapore Patent Application No. 200800381-6.

* cited by examiner

*Primary Examiner*—Pankaj Kumar
*Assistant Examiner*—Gautam Sharma
(74) *Attorney, Agent, or Firm*—Locke Lord Bissell & Liddell

(57) ABSTRACT

A system for optimizing the operation of a plurality of radio modules incorporated within a wireless communication device (WCD) connected as a slave on a low-power wireless network, wherein a low-power device is acting as the master of the wireless network. The timing of communication between master and slave may be established by the master, and as a result, the WCD may utilize a control strategy to allow substantially concurrent active communication in one or more of the plurality of radio modules while still operating under the parameters set forth by the low-power master device.

38 Claims, 30 Drawing Sheets

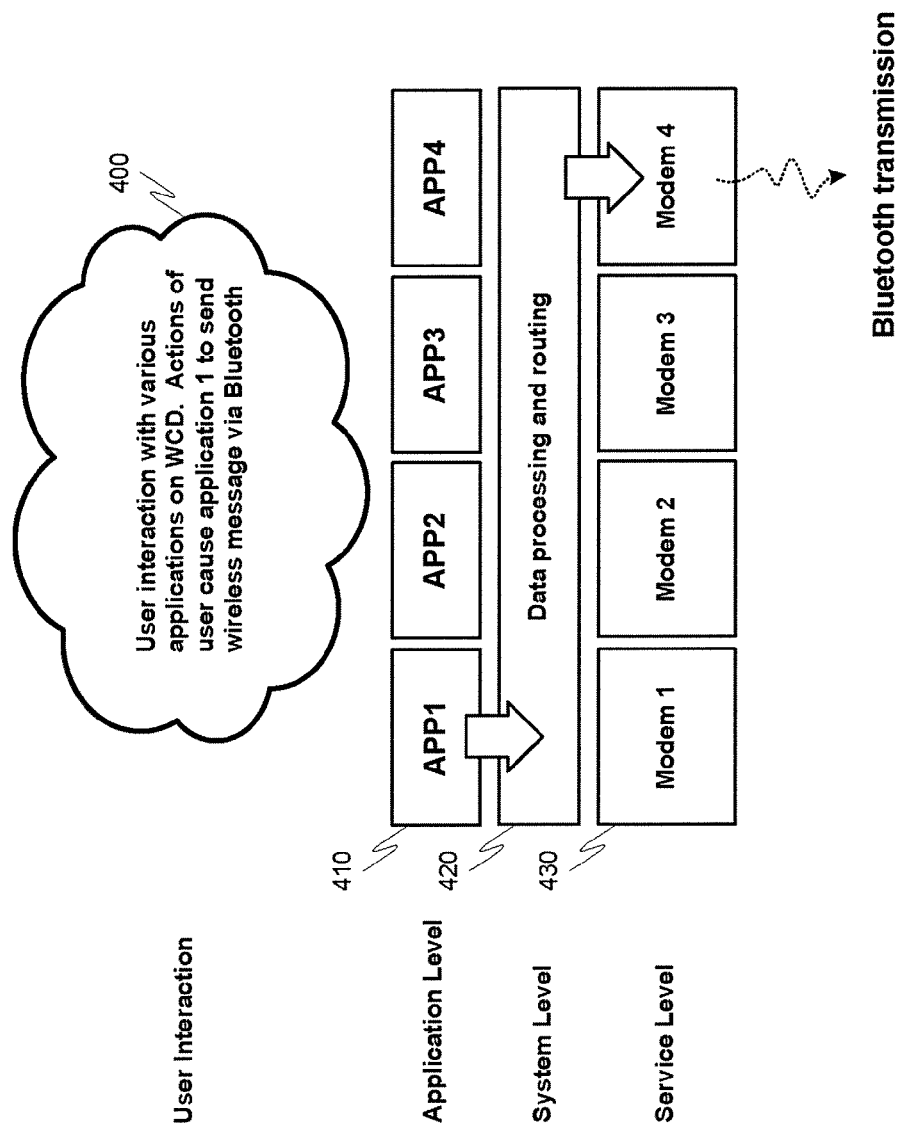

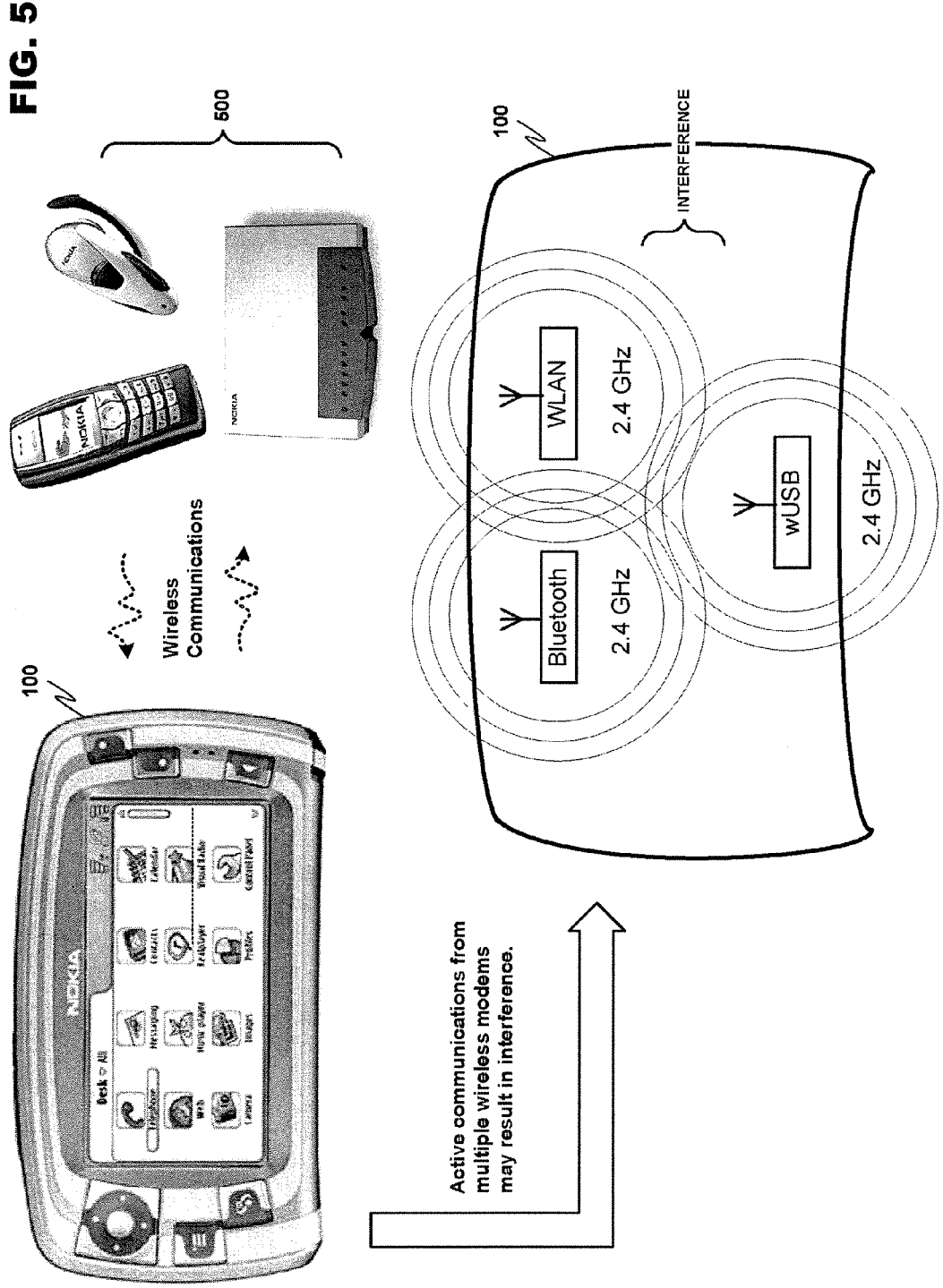

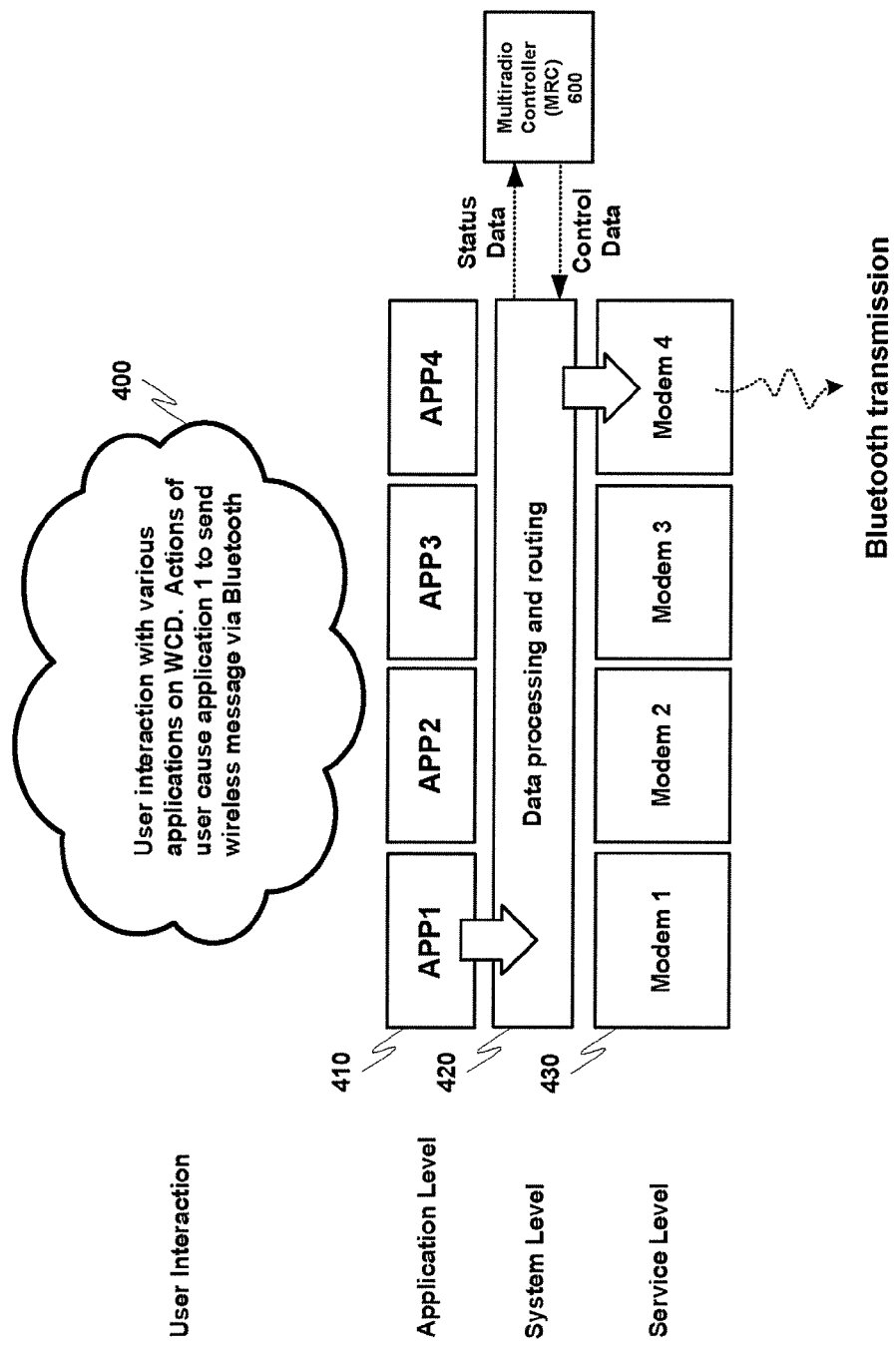

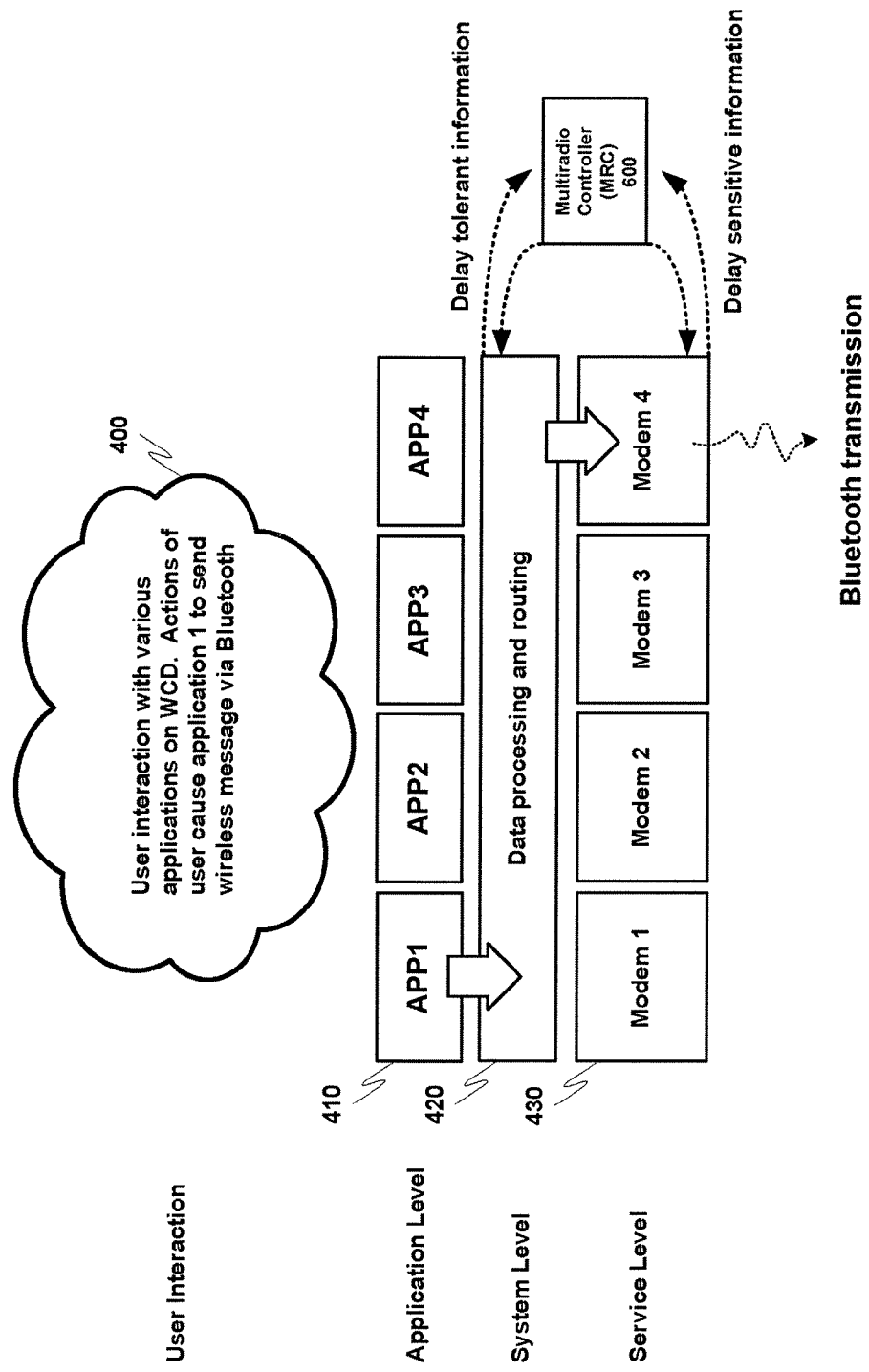

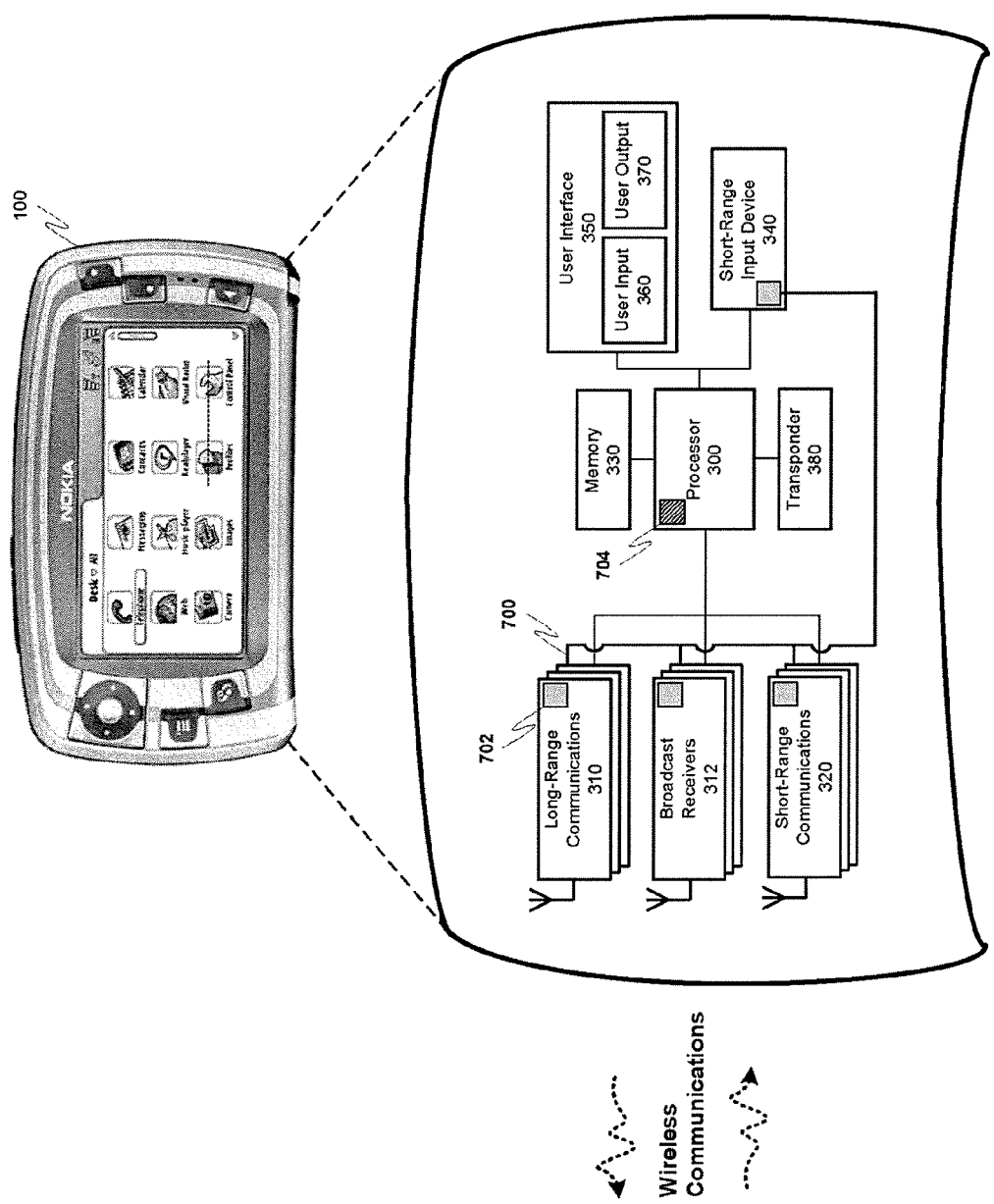

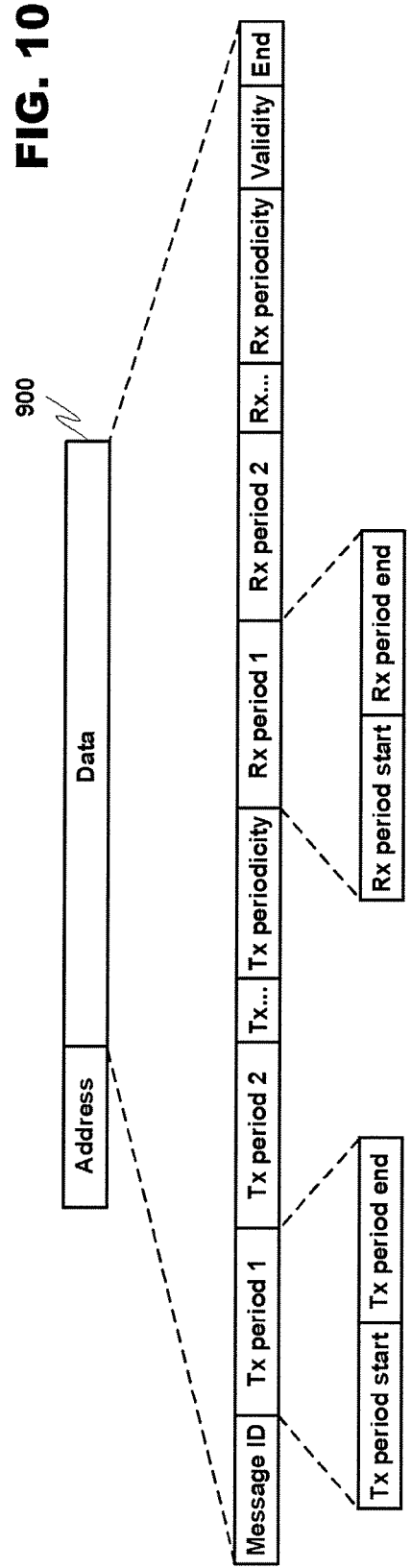

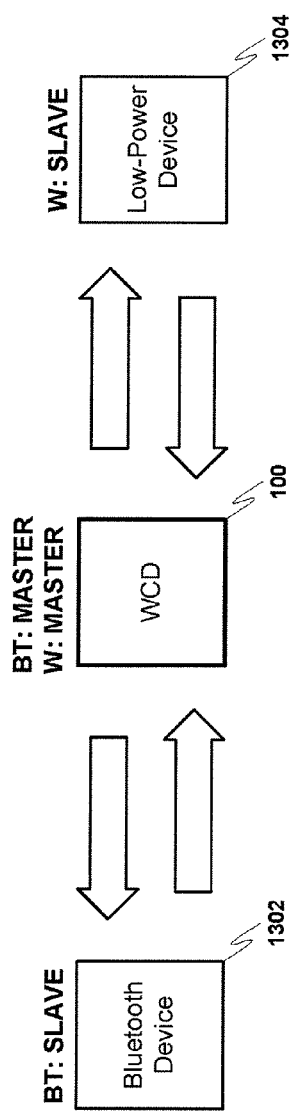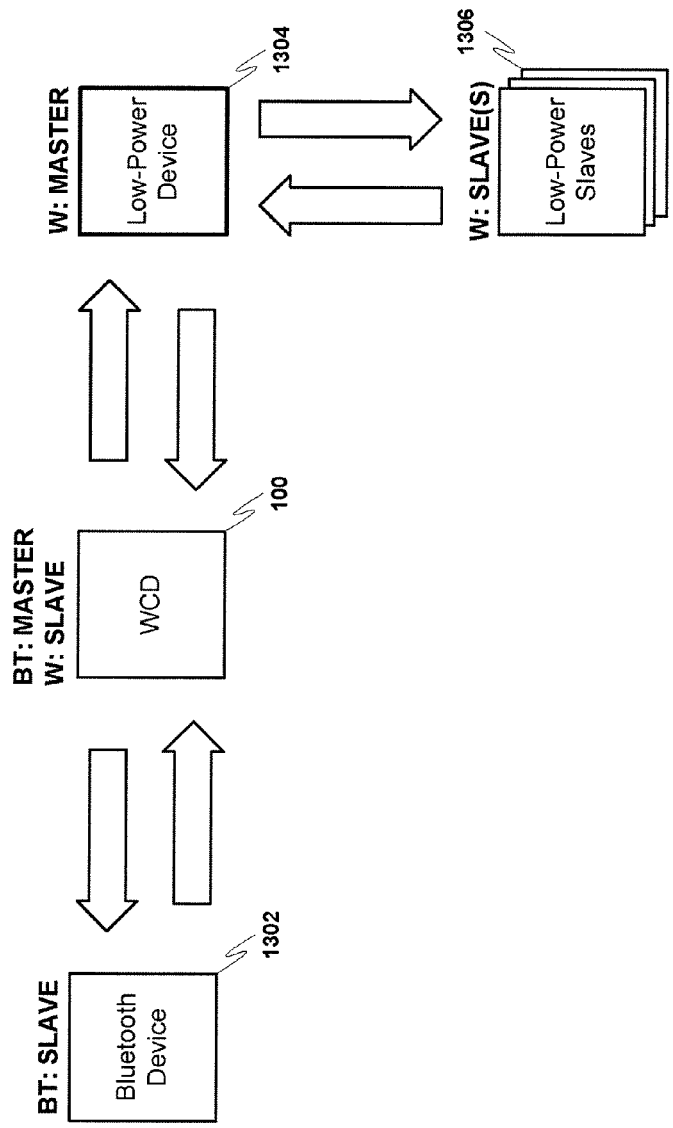

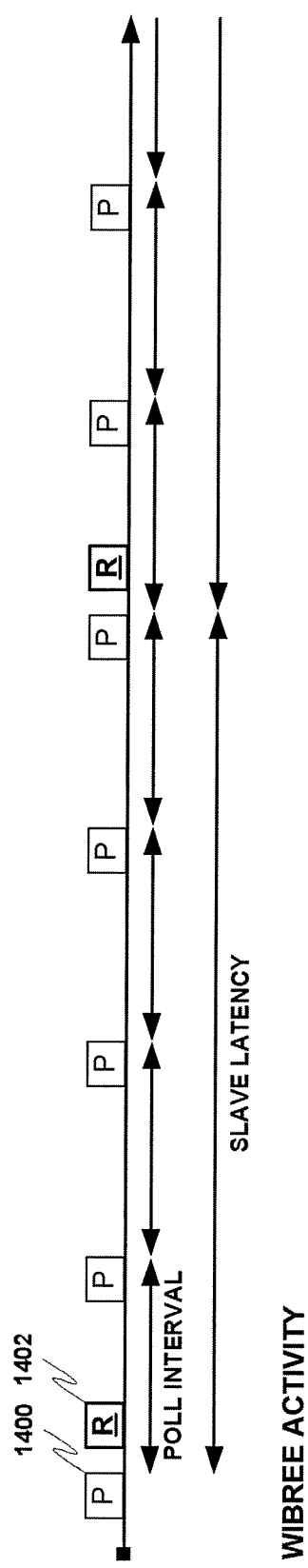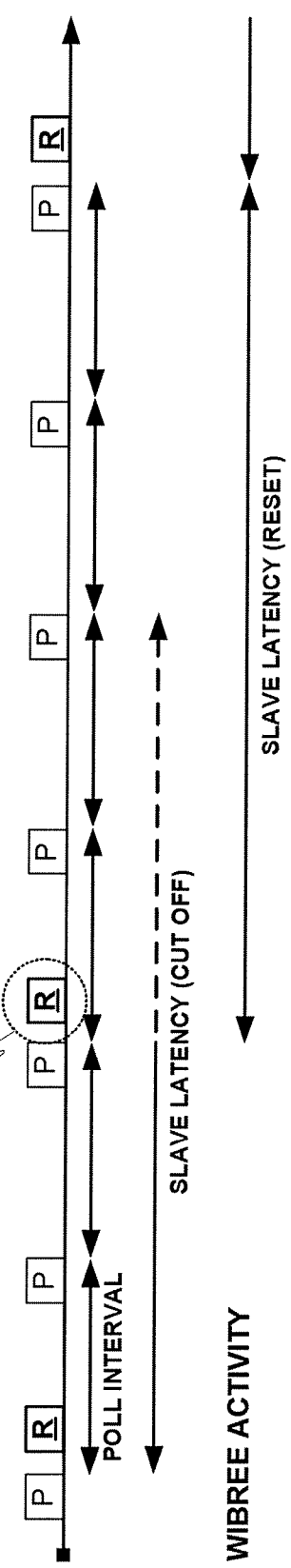

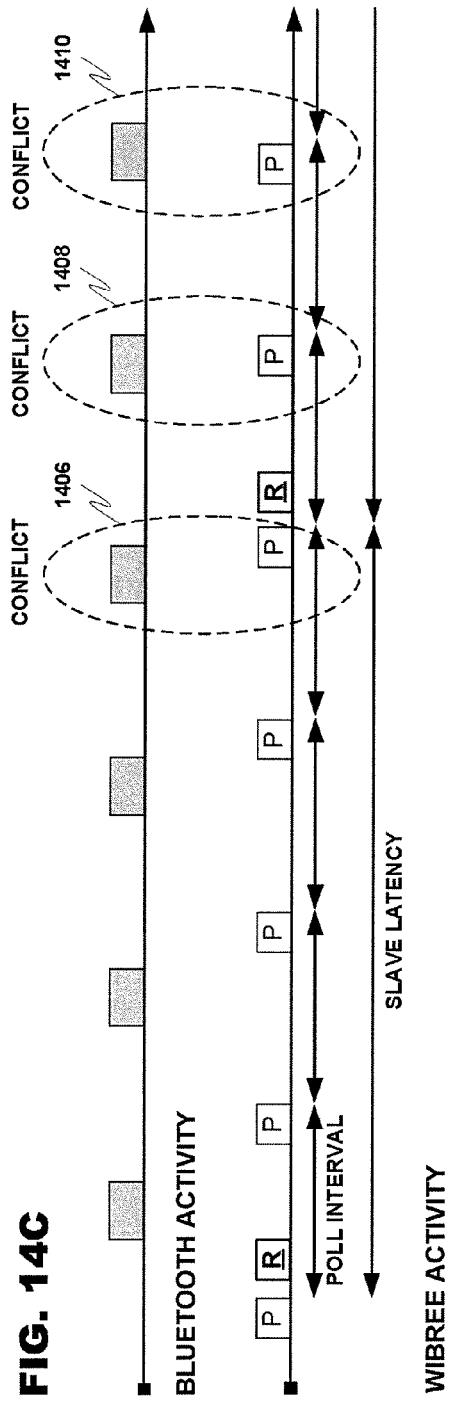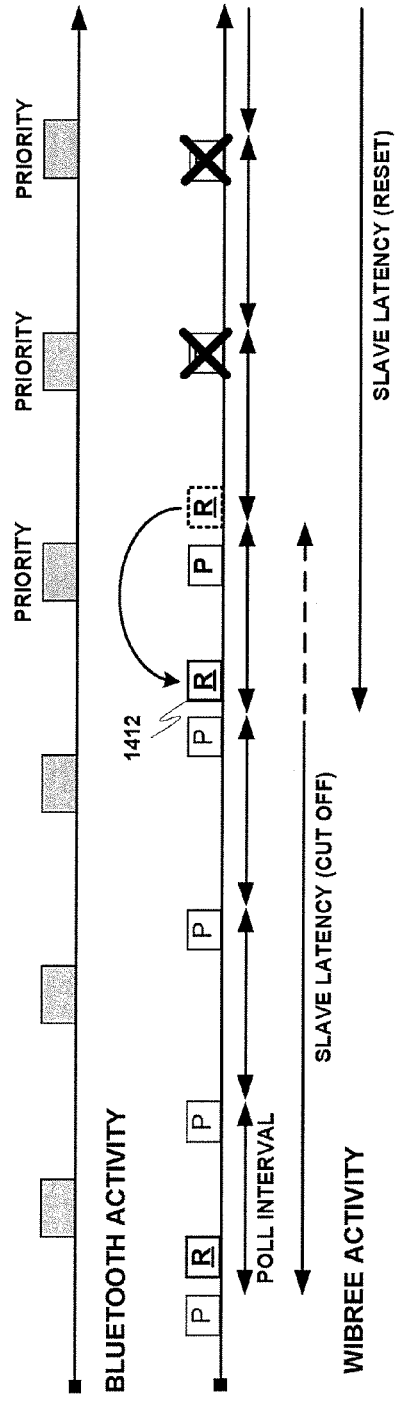

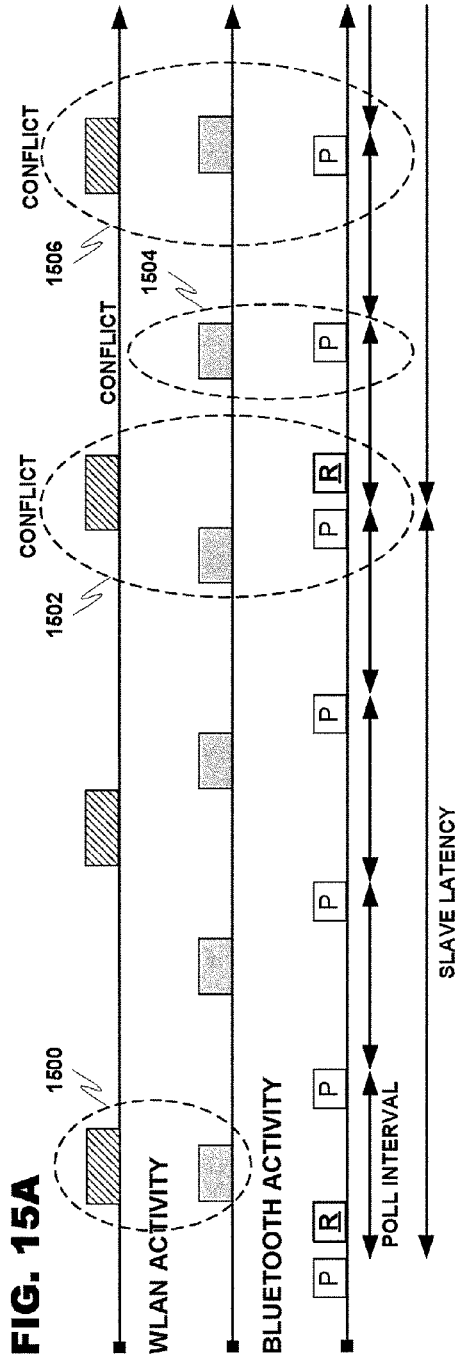

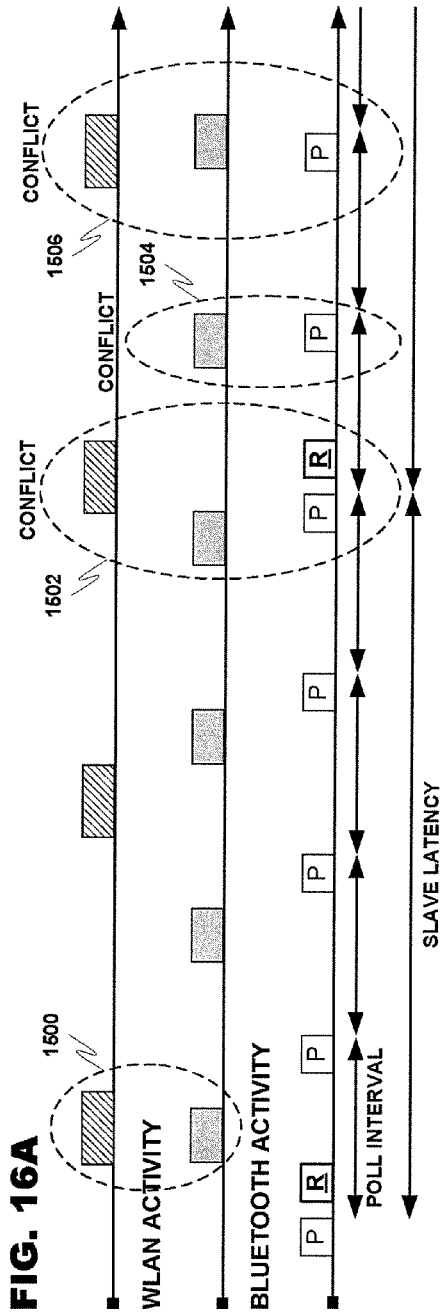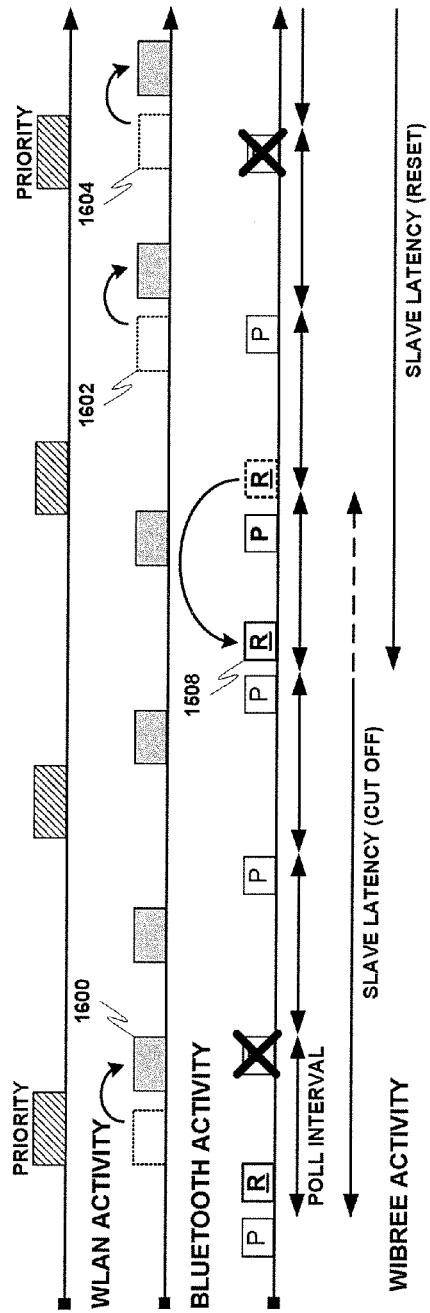

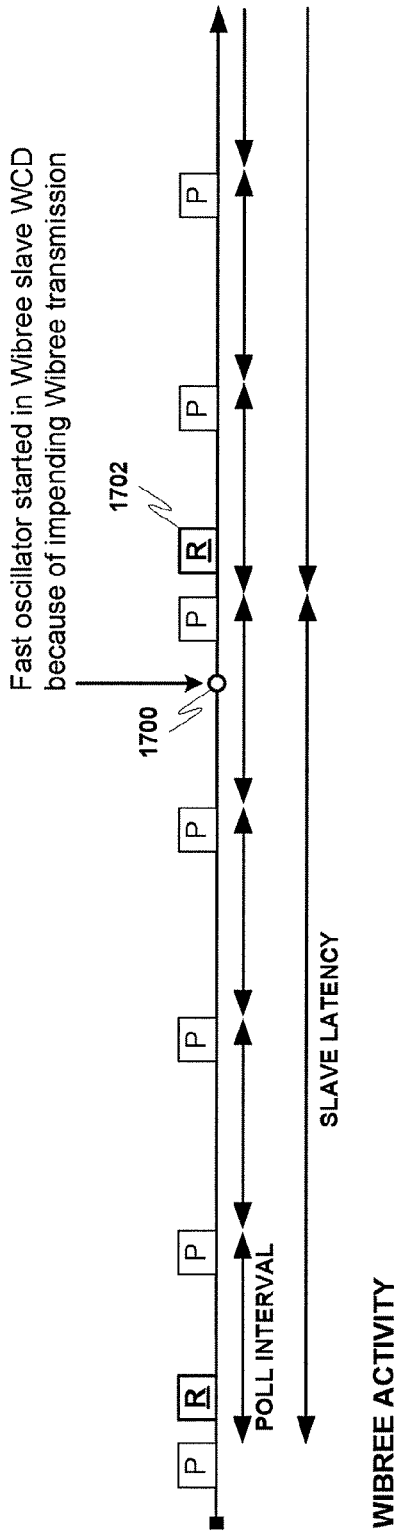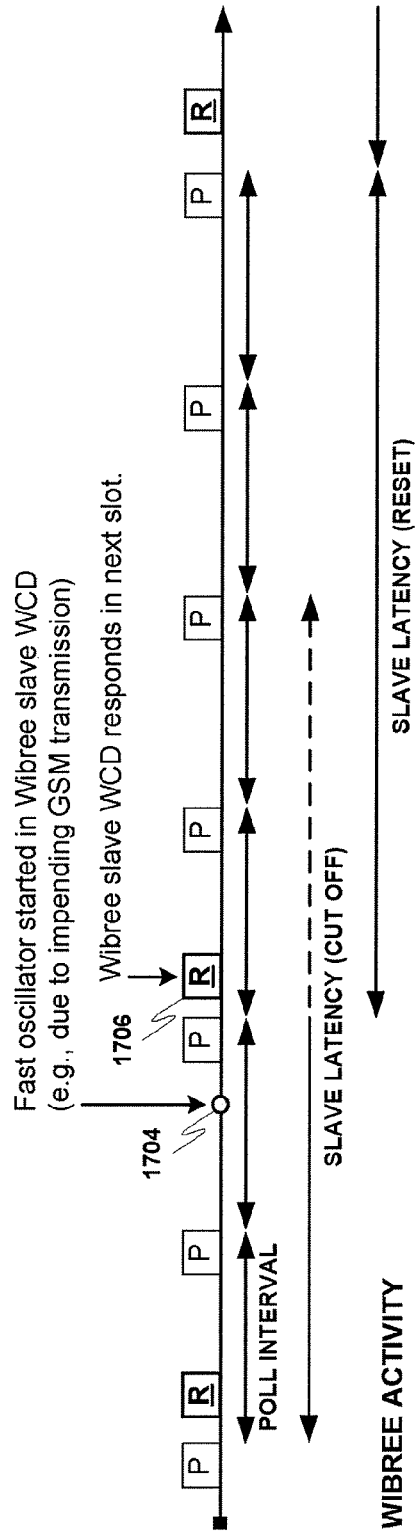

MANAGING LOW-POWER WIRELESS MEDIUMS IN MULTIRADIO DEVICES

BACKGROUND OF INVENTION

1. Field of Invention

The present invention relates to a system for managing one or more radio modules in a wireless communication device, and more specifically, to a system and method for managing the operation of a dual-mode radio module integrated within a wireless communication device so as to avoid conflicts when connected to a short-range wireless network in a slave mode.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user is not required to actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or readers may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and machine readable communication resources also often include multiple wireless mediums or radio protocols for each category. A multitude of wireless media options may assist a WCD in quickly adjusting to its environment, for example, communicating both with a WLAN access point and a Bluetooth™ peripheral device, possibly (and probably) at the same time.

Given the large array communication features that may be compiled into a single device, it is foreseeable that a user will need to employ a WCD to its full potential when replacing other productivity related devices. For example, a user may use a multifunction WCD to replace traditional tools such as individual phones, facsimile machines, computers, storage media, etc. which tend to be more cumbersome to both integrate and transport. In at least one use scenario, a WCD may be communicating simultaneously over numerous different wireless mediums. A user may utilize multiple peripheral Bluetooth™ devices (e.g., a headset and a keyboard) while having a voice conversation over GSM and interacting with a WLAN access point in order to access the Internet. Problems may occur when these concurrent transactions cause interference with each other. Even if a communication medium does not have an identical operating frequency as another medium, a radio modem may cause extraneous interference to another medium. Further, it is possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

While a WCD may engage in wireless communication with a multitude of other devices concurrently, in some instances a resource constraint may arise where two or more of the peripheral devices are communicating using radio protocols that are implemented into a single radio modem in the WCD. Such a scenario may occur, for example, when both a Bluetooth™ device and a Wibree™ device are being used concurrently. Wibree™ is an open standard industry initiative extending local connectivity to small devices with technology that increases the growth potential in these market segments. Wibree™ technology may complement close range communication with Bluetooth™-like performance in the 0-10 m range with a data rate of 1 Mbps. Wibree™ is optimized for applications requiring extremely low power consumption, small size and low cost. Wibree™ may be implemented either as stand-alone chip or as Bluetooth™-Wibree™ dual-mode chip. More information can be found on the Wibree™ website: www.wibree.com. Due to the similarity of these two radio protocols, a WCD may only include one radio modem assigned to handle communication for both wireless mediums. One radio modem attempting to communicate with multiple devices using separate radio protocols, also known as a dual-mode radio modem, may experience communication errors due to the collision of messages from the peripheral devices. Wireless communication devices are usually scheduled only within their own radio protocol, and therefore, may be unaware that other simultaneous transactions may be occurring in a dual-mode radio modem over another radio protocol. Technology is now emerging to enable a WCD to schedule communications amongst a plurality of modems integrated within the same device, however, this control strategy may not necessarily benefit a dual-mode radio modem where the conflicts are not known at the operating system level, but only by the modem itself.

Further, scenarios may be foreseeable wherein a low-power wireless device acts as a master to other low-power slave devices while simultaneously communicating with a WCD. For example, a portable data collection device (e.g., a "smart" wristwatch) may be worn by someone performing physical activity to wirelessly receive (e.g., via Wibree™) physiological data from simple sensory devices located on various parts of the person's body. The sensor data may then be compiled and/or processed in the data collection device and wirelessly forwarded to a WCD for additional computation and/or viewing. Alternatively, the data collection and viewing responsibilities may be reversed, wherein the smart wristwatch acts as a viewer for information collected by the WCD. Regardless of the configuration, the more powerful WCD traditionally acts as a master to simpler devices in a wireless network. However, a low-power device acting as a master in its own network and a slave in another network, or "Scatternetting," may not be supported in simpler communication mediums. In addition, low-power devices may not include the necessary processing power to allow for acting in different roles in multiple networks due to power and/or size limitations in these devices. As a result, a more complex device managing multiple active radio modules would necessarily be forced to operate in a slave mode, succumbing to the timing and control limitations of a simpler master.

In view of this problematic situation, what is therefore needed is a communication management system and strategy for a WCD that is acting in a slave role while communicating using a dual-mode radio module. The system should allow the WCD to maintain substantially concurrent communications over a plurality of radio modules while operating within the constraints established by a network-connected low-power device acting in a master role.

SUMMARY OF INVENTION

The present invention includes at least a method, device, radio module and computer program for optimizing the operation of a plurality of radio modules incorporated within a WCD connected as a slave on a low-power network, wherein a low-power device is acting as the master of the network. The timing of communication between master and slave may be established by the master, and as a result, the WCD may utilize a control strategy to allow substantially concurrent active communication in one or more of the plurality of radio modules while still operating under the parameters set forth by the low-power master device.

In at least one embodiment of the present invention, the wireless network connection may be asynchronous. In an asynchronous wireless network, slaves are not required to respond to every inquiry (poll) sent by the master. As a result, the master device of the low-power network may establish timing parameters under which all slaves on the network must operate in order to determine what slaves are still participating in the network. These parameters may include at least a master polling interval and a slave latency period. The master polling interval may dictate the rate at which the master polls the clients in order to exchange wireless information. The slave latency period may establish the maximum period of time for response to the polls of a master device in order to maintain connectivity to the short-range communication network. If the low-power network is the only active wireless network connection for a WCD containing a plurality of radio modules, then maintaining contact with the master may be straightforward. However, a WCD with multiple active radio modules may create a problematic communication management scenario.

In situations where multiple radio modules may be simultaneously active in a WCD, the present invention in at least one embodiment, may take into account the relative priority and flexibility of the various radio modules while optimizing communication. For example, the ability of the various wireless communication mediums to retransmit information may be considered in determining the radio module that should be assigned priority. In a case including a low-power medium, a slave WCD that typically responds only in accordance with the slave latency period may be triggered to respond during an earlier master polling interval in order to avoid a potential conflict with a higher priority radio module. Further, the activation of communication-related components within the WCD may also trigger a pre-emptive response to the master of the low-power network in order to preserve the connection with the master device.

DESCRIPTION OF DRAWINGS

The invention will be further understood from the following detailed description of a preferred embodiment, taken in conjunction with appended drawings, in which:

FIG. 4 discloses an exemplary operational description of a wireless communication device utilizing a wireless communication medium in accordance with at least one embodiment of the present invention.

FIG. 5 discloses an operational example wherein interference occurs when utilizing multiple radio modems simultaneously within the same wireless communication device.

FIG. 6C discloses an exemplary operational description of a wireless communication device including a multiradio controller in accordance with at least one embodiment of the present invention.

FIG. 7C discloses an exemplary operational description of a wireless communication device including a multiradio control system in accordance with at least one embodiment of the present invention.

FIG. 8A discloses an exemplary structural description of a wireless communication device including a distributed multiradio control system in accordance with at least one embodiment of the present invention.

FIG. 10 discloses an exemplary information packet usable with at least one embodiment of the present invention.

FIG. 13A discloses an exemplary wireless network wherein the master is a wireless communication device in accordance with at least one embodiment of the present invention.

FIG. 13B discloses an exemplary wireless network wherein the master is a low-power device in accordance with at least one embodiment of the present invention.

FIG. 14A discloses an example of a radio module activity timeline for a low-power communication medium (e.g., Wibree™) in accordance with at least one embodiment of the present invention.

FIG. 14B discloses another example of a radio module activity timeline for a low-power communication medium (e.g., Wibree™) wherein management may be implemented in accordance with at least one embodiment of the present invention.

FIG. 14C discloses an example of two conflicting radio modules in the same wireless communication device in accordance with at least one embodiment of the present invention.

FIG. 14D discloses an example of managing the operation of two conflicting radio modules in the same wireless communication device in accordance with at least one embodiment of the present invention.

FIG. 15A discloses an example of three conflicting radio modules in the same wireless communication device in accordance with at least one embodiment of the present invention.

FIG. 15B discloses an example of managing the operation of three conflicting radio modules in the same wireless communication device in accordance with at least one embodiment of the present invention.

FIG. 16A discloses another example of three conflicting radio modules in the same wireless communication device in accordance with at least one embodiment of the present invention.

FIG. 16B discloses another example of managing the operation of three conflicting radio modules in the same wireless communication device in accordance with at least one embodiment of the present invention.

FIG. 17A discloses an example of a radio module reacting to the activation of a communication related component in the same wireless communication device in accordance with at least one embodiment of the present invention.

FIG. 17B discloses another example of a radio module reacting to the activation of a communication related component in the same wireless communication device in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
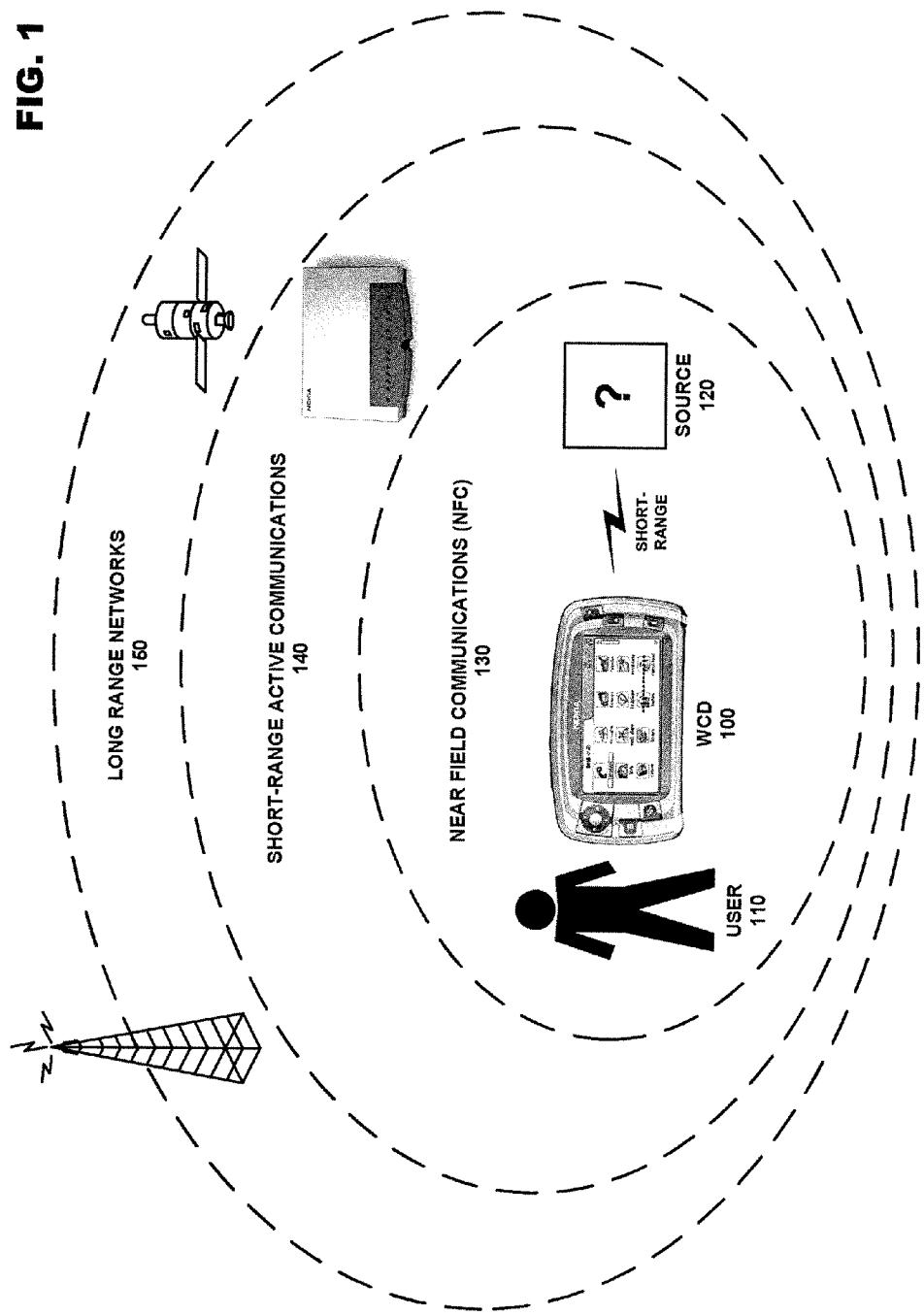
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Wibree™, a network may be established to transmit information to WCD 100 possessed by user 110. Wibree™ may be used for battery-powered devices, such as wireless sensors, since its power consumption is low. A Wibree™ slave device may use an advertisement mode (or a scan mode in a master device) to more rapidly establish the initial connection to WCD 100. The amount of information that may be conveyed is unlimited, except that it must all be transferred in the time when user 110 is within effective transmission range of the access point. This duration may be extremely limited if the user is, for example, strolling through a shopping mall or walking down a street. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
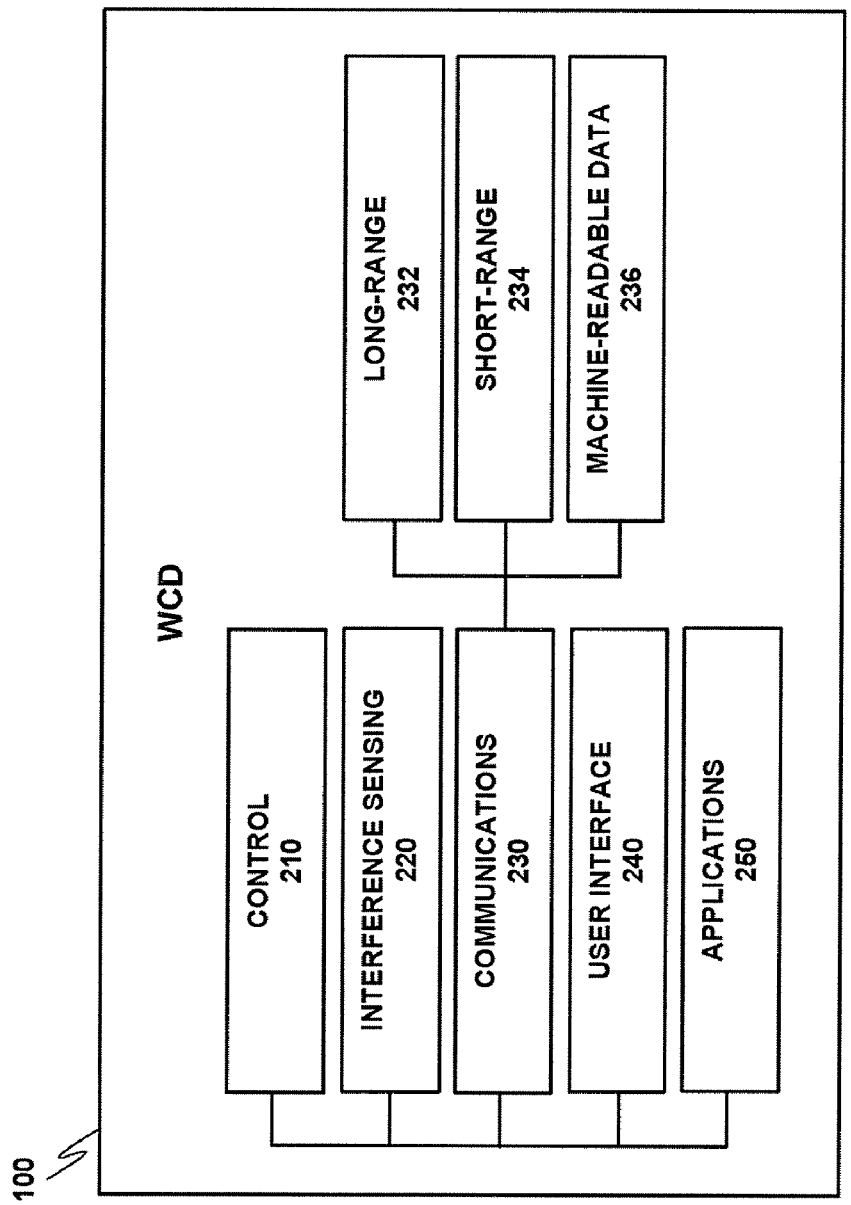
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
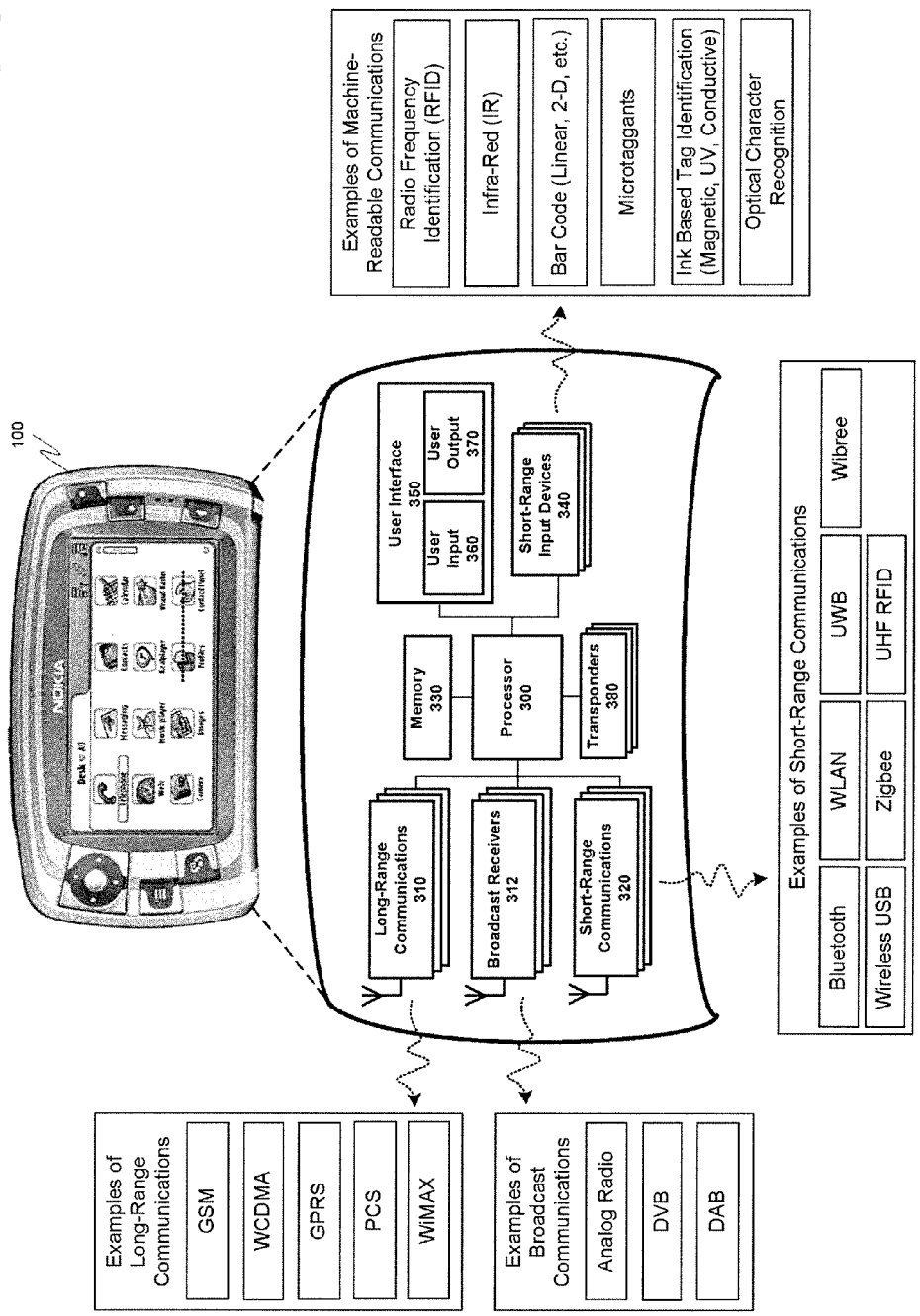
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to at least communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, Wibree™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by short-range input device 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID reader mounted in an entryway may continuously emit radio frequency waves. When a person with a device containing transponder 380 walks through the door, the transponder is energized and may respond with information identifying the device, the person, etc. In addition, a reader may be mounted (e.g., as discussed above with regard to examples of short-range input device 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered FIG. 4 discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and enabled to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely. The present invention, in at least one embodiment, seeks to manage problematic situations where possibly conflicting communications may be occurring simultaneously so that interference is minimized or totally avoided, and as a result, speed and quality are maximized.

IV. A Wireless Communication Device Including a Multiradio Controller

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100. While this configuration may in some cases improve overall wireless communication efficiency for WCD 100, problems may occur when WCD 100 becomes busy (e.g., when the control system of WCD 100 is employed in multitasking many different simultaneous operations, both communication and non-communication related).

Figure 6A:
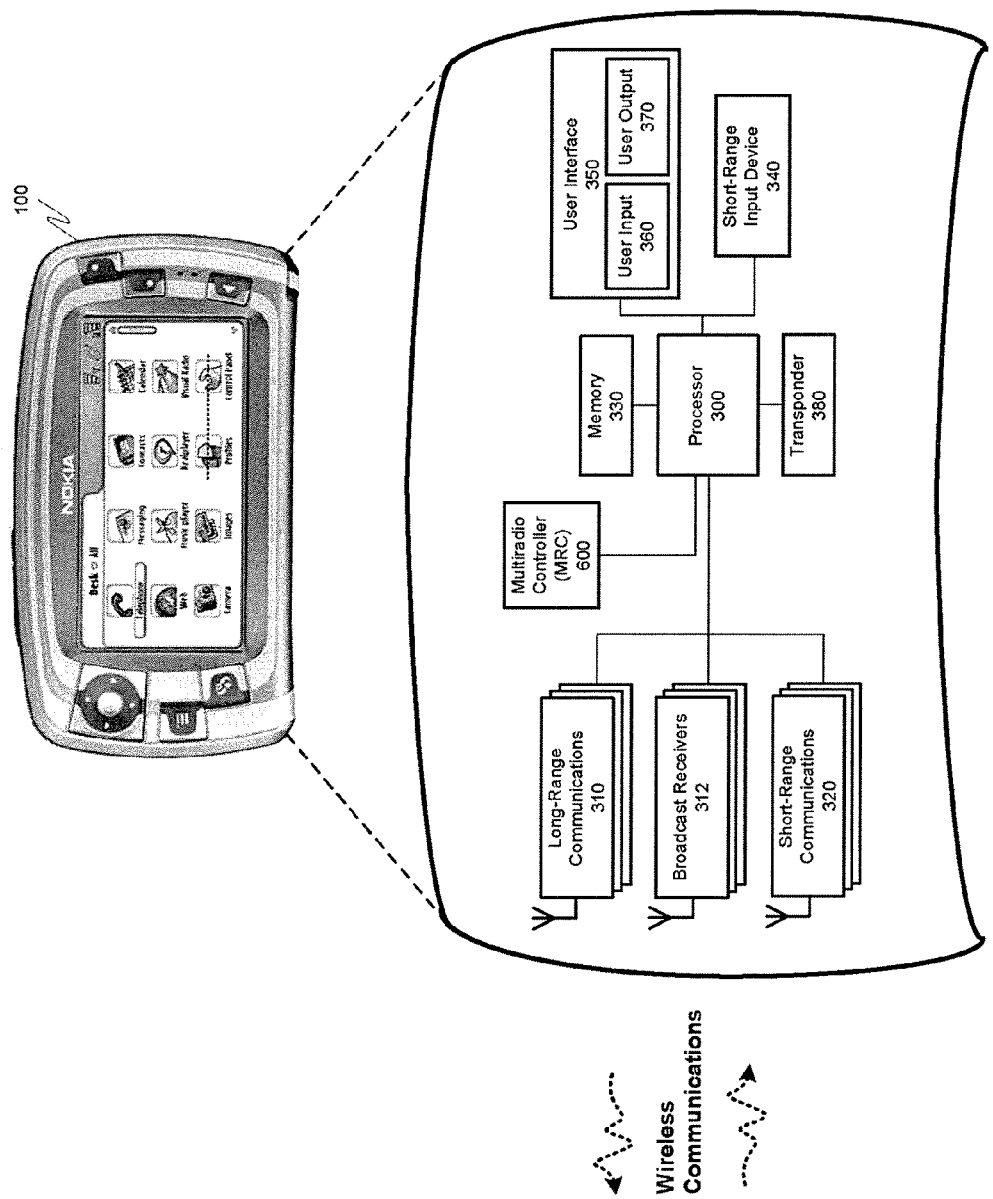
FIG. 6A discloses an exemplary structural description of a wireless communication device including a multiradio controller in accordance with at least one embodiment of the present invention.
Figure 6B:
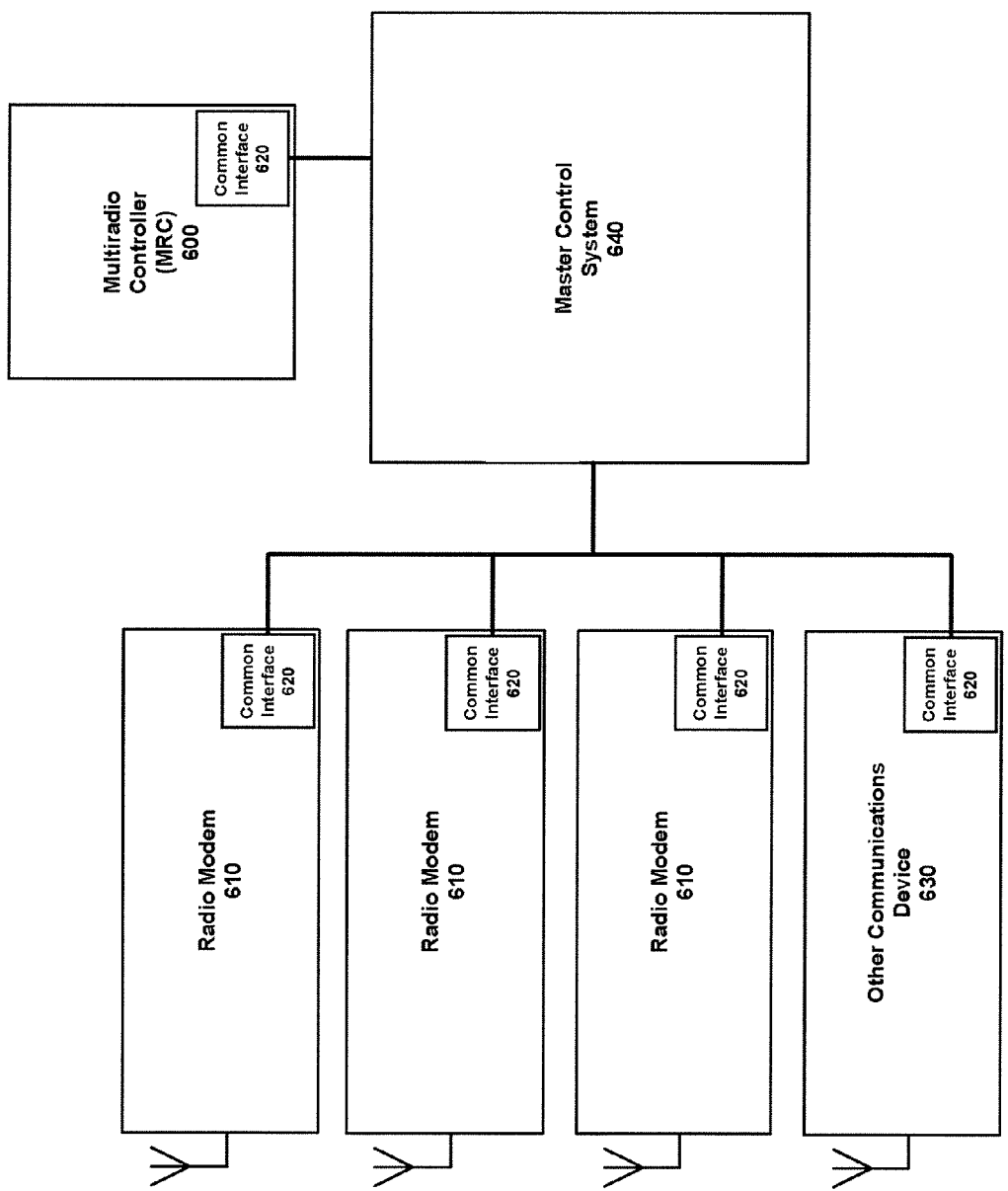
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Radio modems 610 and other devices 630 may also be referred to as "modules" in this disclosure as they may contain supporting hardware and/or software resources in addition to the modem itself. These resources may include control, interface and/or processing resources. For example, each radio modem 610 or similar communication device 630 (e.g., an RFID scanner for scanning machine-readable information) may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System

Figure 7A:
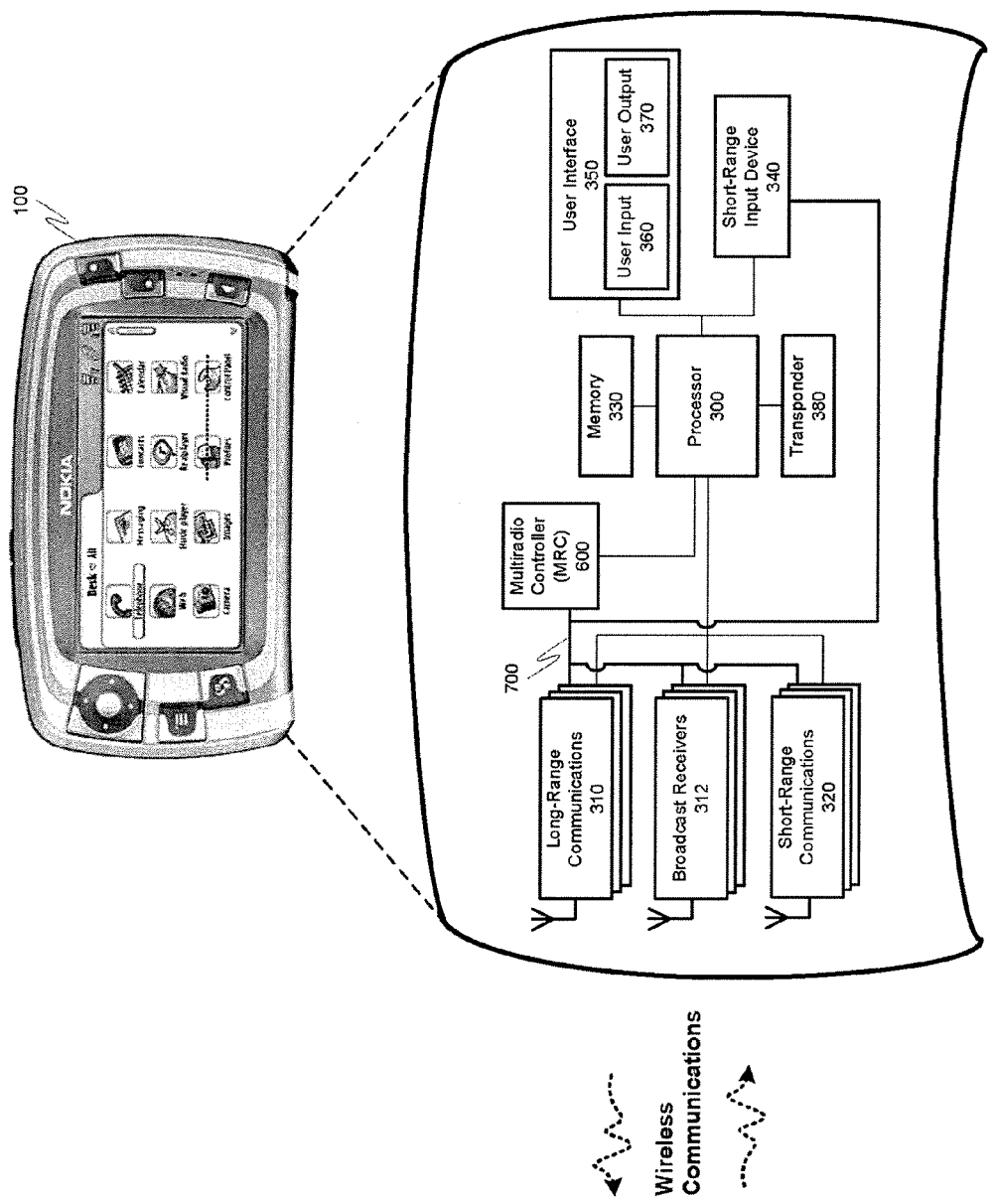
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Figure 7B:
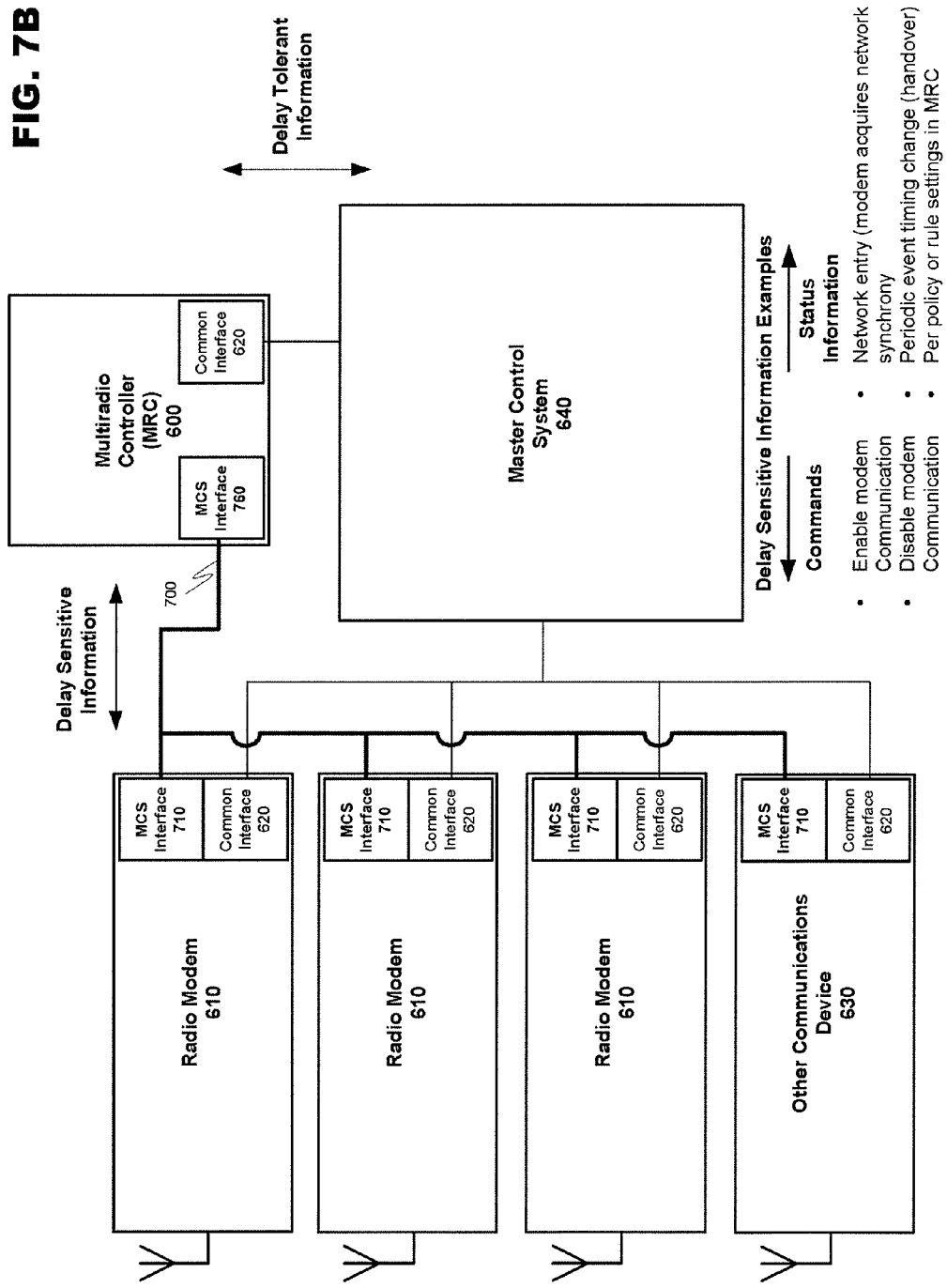
FIG. 7B discloses a more detailed structural diagram of FIG. 7A including the multiradio control system and the radio modems.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

VI. A Wireless Communication Device Including a Distributed Multiradio Control System FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems 610, reducing the overall amount of control command traffic in WCD 100.

MCS 700, in this example, may be implemented utilizing a variety of bus structures, including the $I^2C$ interface commonly found in portable electronic devices, as well as emerging standards such as SLIMbus that are now under development. $I^2C$ is a multi-master bus, wherein multiple devices can be connected to the same bus and each one can act as a master through initiating a data transfer. An $I^2C$ bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's $I^2C$ and $I^2S$ interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 8B:
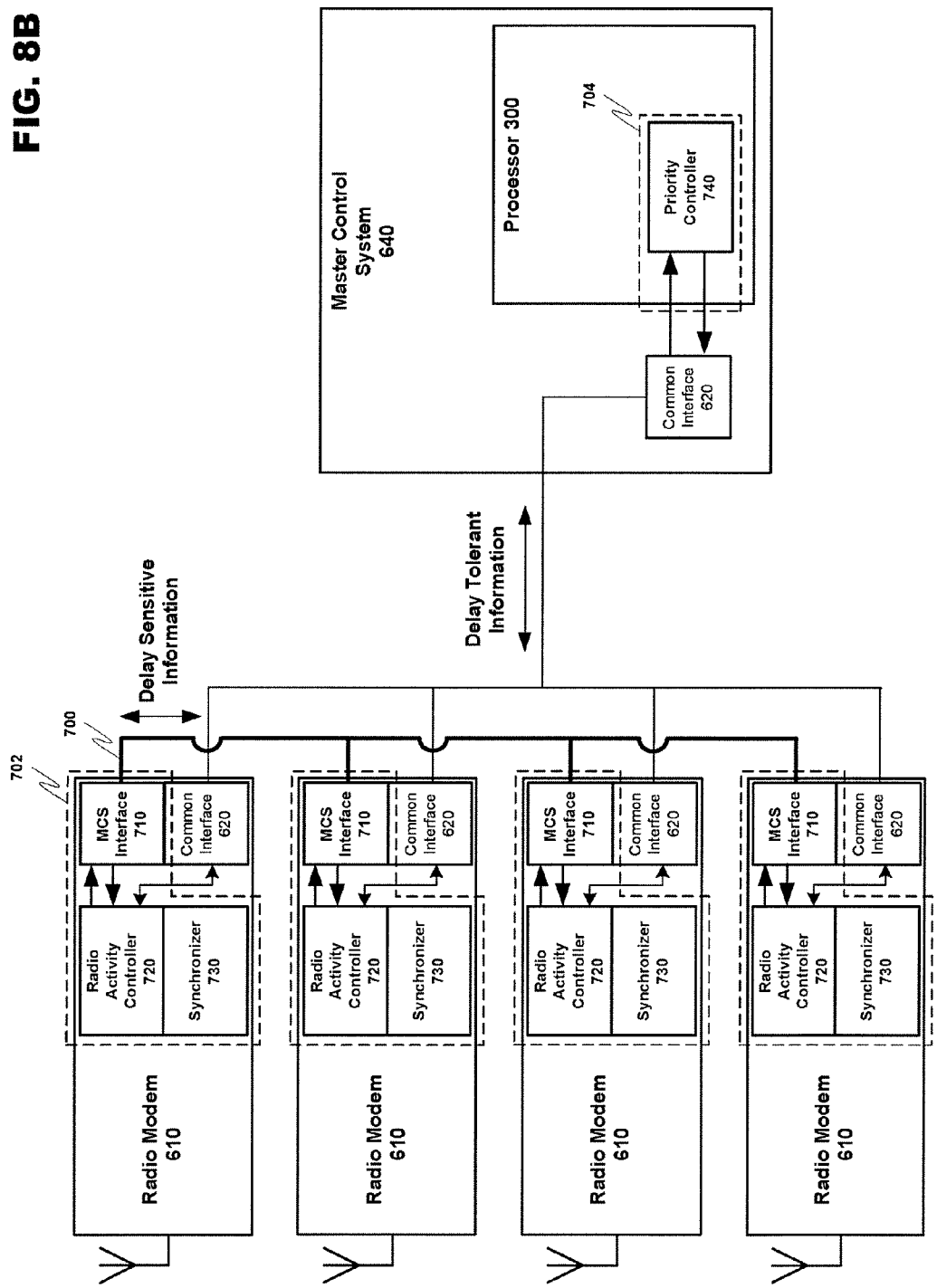
FIG. 8B discloses a more detailed structural diagram of FIG. 8A including the distributed multiradio control system and the radio modems.

The exemplary embodiment disclosed in FIG. 8A is described with more detail in FIG. 8B. MCS 700 forms a direct link between distributed control components 702 within WCD 100. Distributed control components 702 in radio modems 610 may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 and their connections and/or services activate/deactivate, and therefore, does not frequently change during the course of an active communication connection in radio modems 610. As a result, this information may be conveyed to radio modems 610 using common interface system 620 in at least one embodiment of the present invention.

Figure 8C:
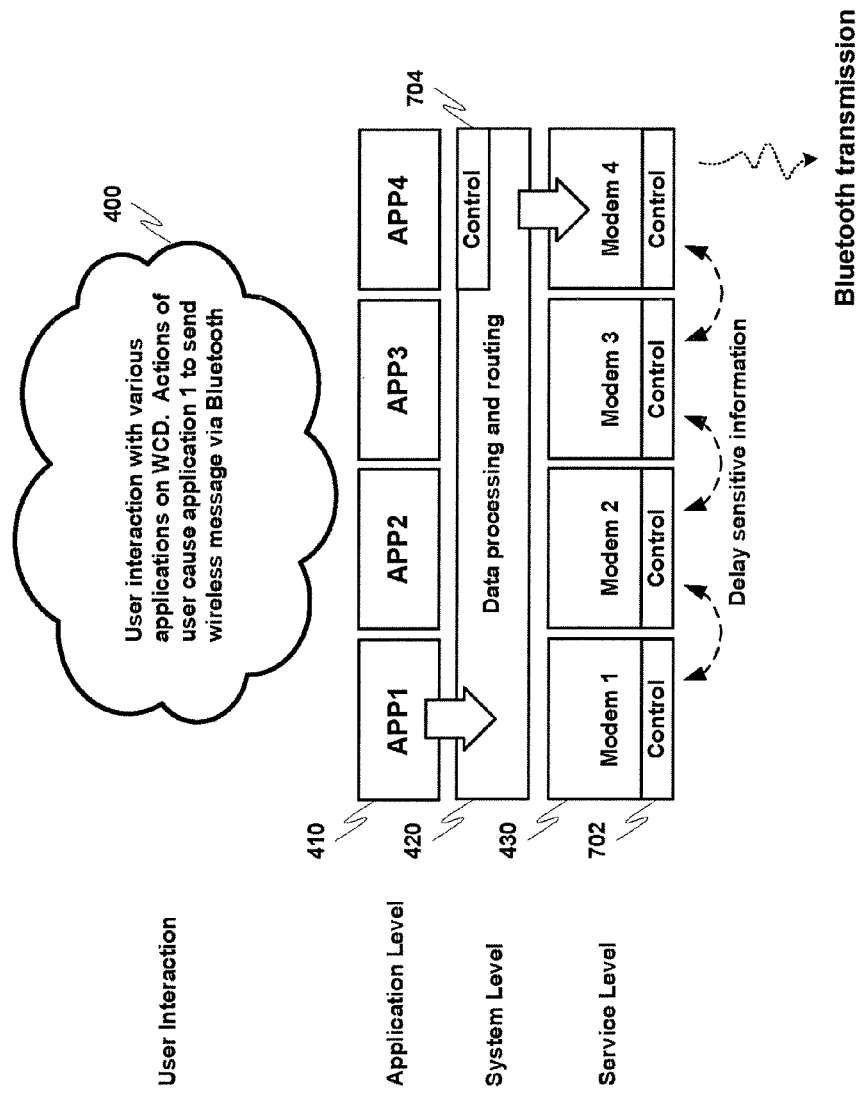
FIG. 8C discloses an exemplary operational description of a wireless communication device including a distributed multiradio control system in accordance with at least one embodiment of the present invention.

At least one effect of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information may include at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in BT (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

The radio modem activity control is based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 µs, followed by an empty slot after which is the reception slot of 577 µs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

Figure 9A:
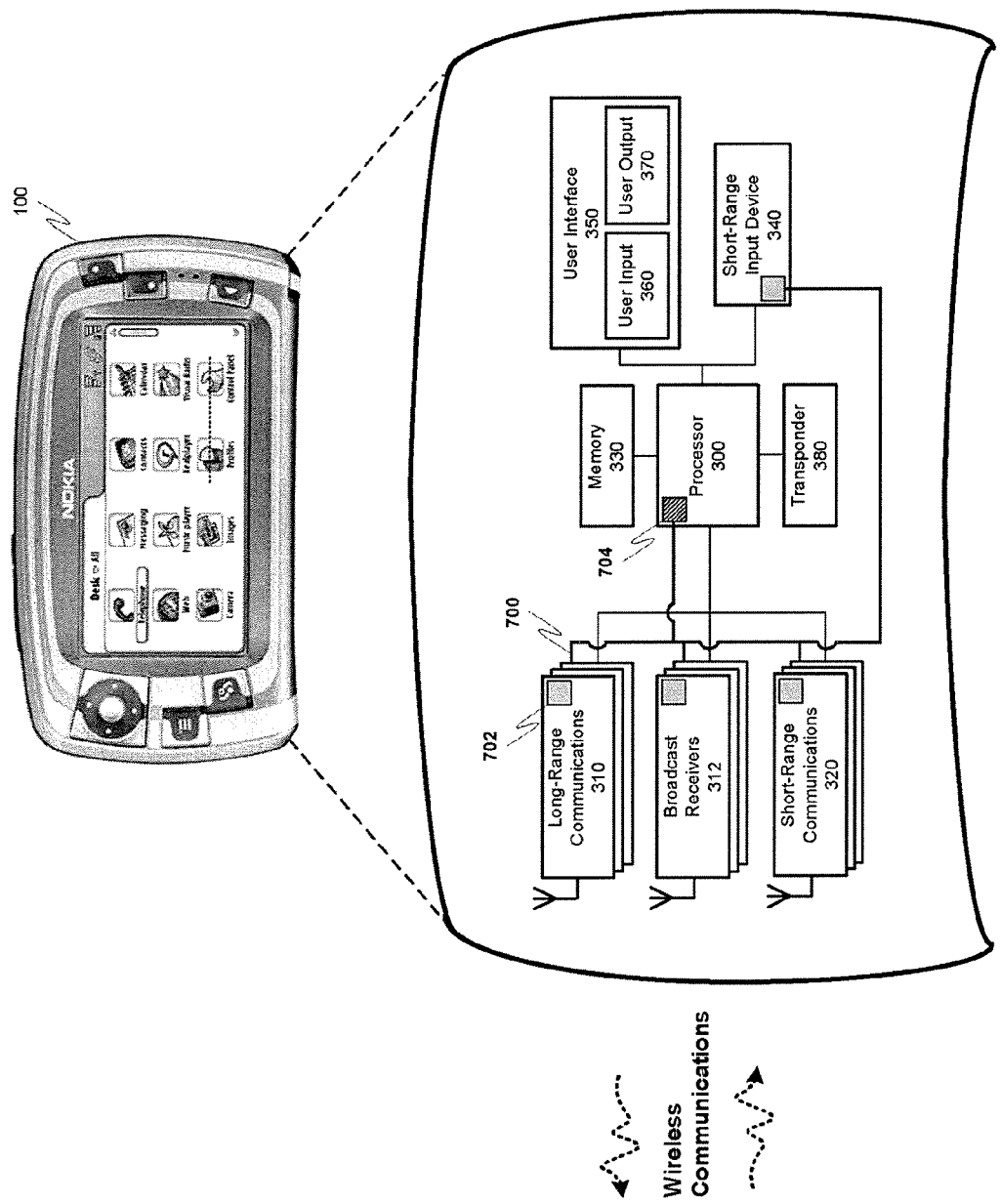
FIG. 9A discloses an exemplary structural description of a wireless communication device including a distributed multiradio control system in accordance with an alternative embodiment of the present invention.

VII. A Wireless Communication Device Including an Alternative Example of a Distributed Multiradio Control System An alternative distributed control configuration in accordance with at least one embodiment of the present invention is disclosed in FIG. 9A-9C. In FIG. 9A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communication components of WCD 100.

Figure 9B:
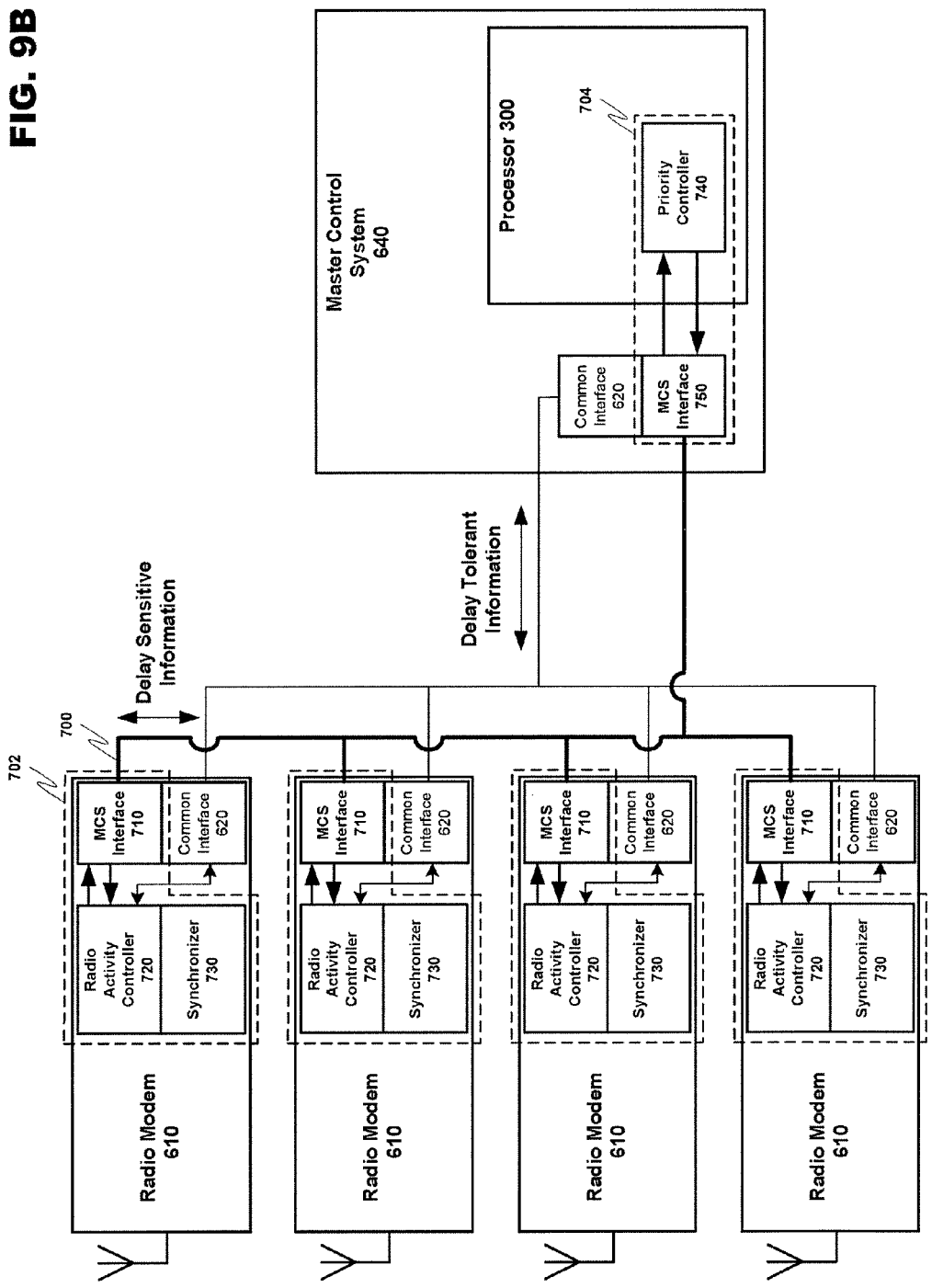
FIG. 9B discloses a more detailed structural diagram of FIG. 9A including the distributed multiradio control system and the radio modems.

Referring now to FIG. 9B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

Figure 9C:
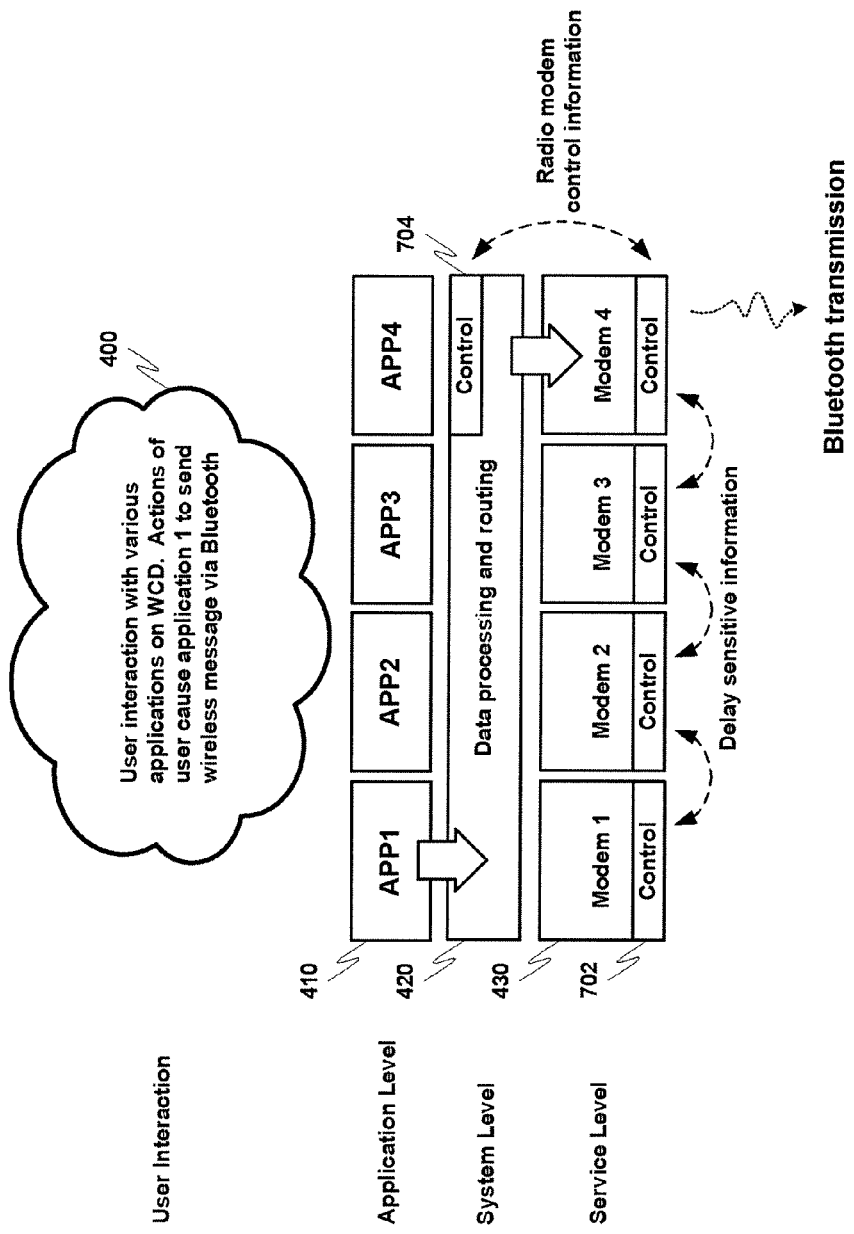
FIG. 9C discloses an exemplary operational description of a wireless communication device including a distributed multiradio control system in accordance with the alternative embodiment of the present invention disclosed in FIG. 9A.

FIG. 9C discloses the operational effect of the enhancements seen in the current alternative embodiment of the present invention on communication in WCD 100. The addition of an alternative route for radio modem control information to flow between distributed control components 702 and 704 may both improve the communication management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

An example message packet 900 is disclosed in FIG. 10 in accordance with at least one embodiment of the present invention. Example message packet 900 includes activity pattern information that may be formulated by MRC 600 or radio activity controller 720. The data payload of packet 900 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices

As a part of information acquisition services, the MCS interface 710 needs to send information to MRC 600 (or radio activity controllers 720) about periodic events of the radio modems 610. Using its MCS interface 710, the radio modem 610 may indicate a time instance of a periodic event related to its operation. In practice these instances are times from which one can calculate when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, the various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

IX. Peripheral Devices Communicating to a Dual-Mode Modem

Figure 11A:
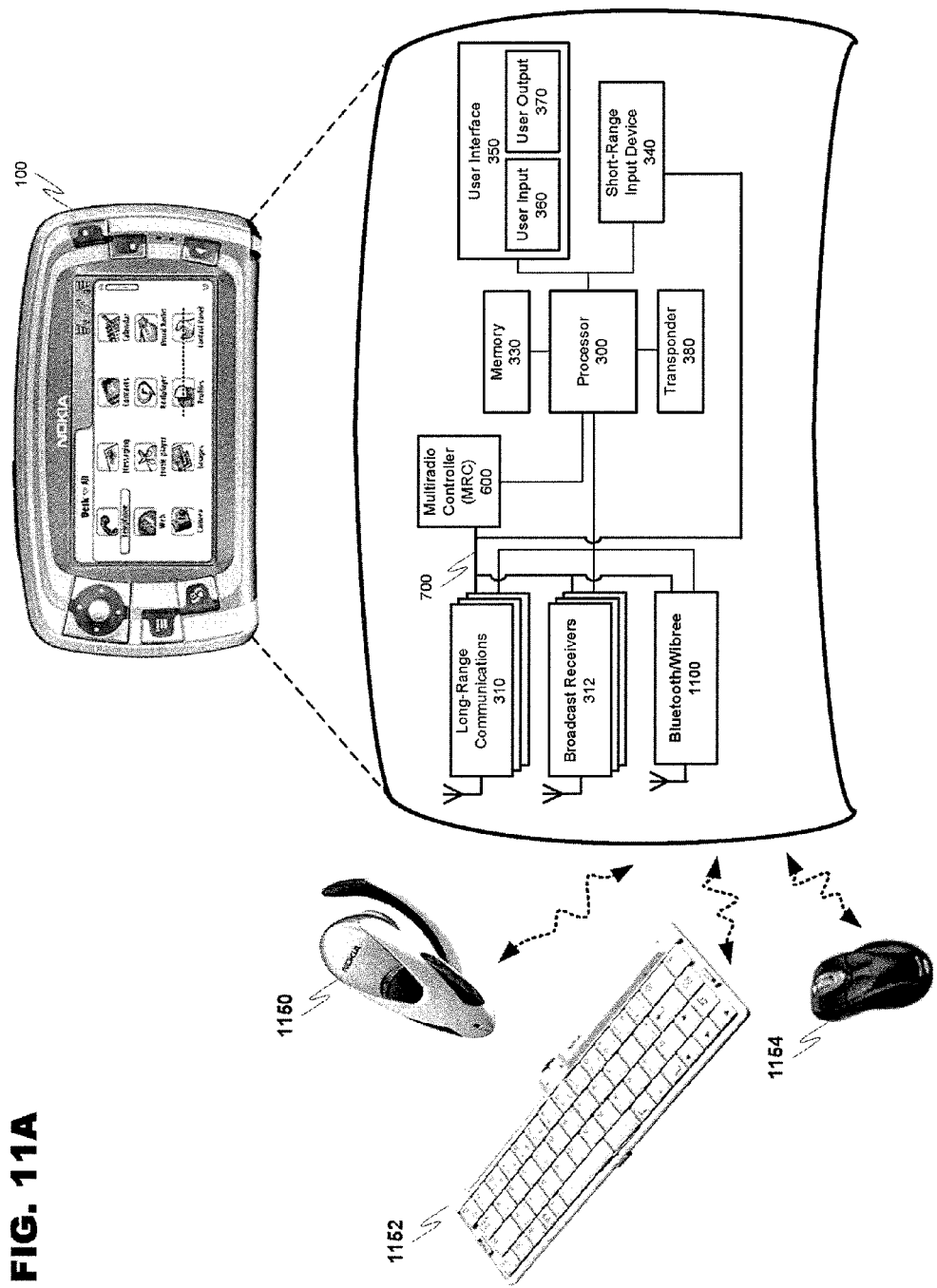
FIG. 11A discloses an example of multiple wireless peripheral devices attempting to communicate concurrently with a dual-mode radio modem in accordance with at least one embodiment of the present invention.

Referring now to FIG. 11A, an exemplary scenario is disclosed, wherein WCD 100 is in active wireless communication with peripheral devices 1150-1154. The use of the phrase "peripheral devices" is not intended to limit the present invention, and is used only to represent any device external to WCD 100 also capable of wirelessly communicating with WCD 100. Such devices may include wireless headset 1150 communicating via Bluetooth™ communication, wireless keyboard 1152 communicating via Wibree™ communication, and wireless mouse 1154 also communicating via Wibree™ communication. All of these peripheral devices may, at least in this example, communicate with a single dual-mode radio modem 1100 in WCD 100. It is foreseeable that user 110 may be conducting a telephone conversation over headset 1150 while typing on keyboard 1152 and interacting with mouse 1154 at the same time. Given a scenario wherein at least two or more peripheral devices are conducting concurrent communication with dual-mode modem 1100, the possibility of experiencing communication collisions is increased. As a result, a strategy for managing the operation of these radio protocols is needed to optimize performance while preserving quality.

Figure 11B:
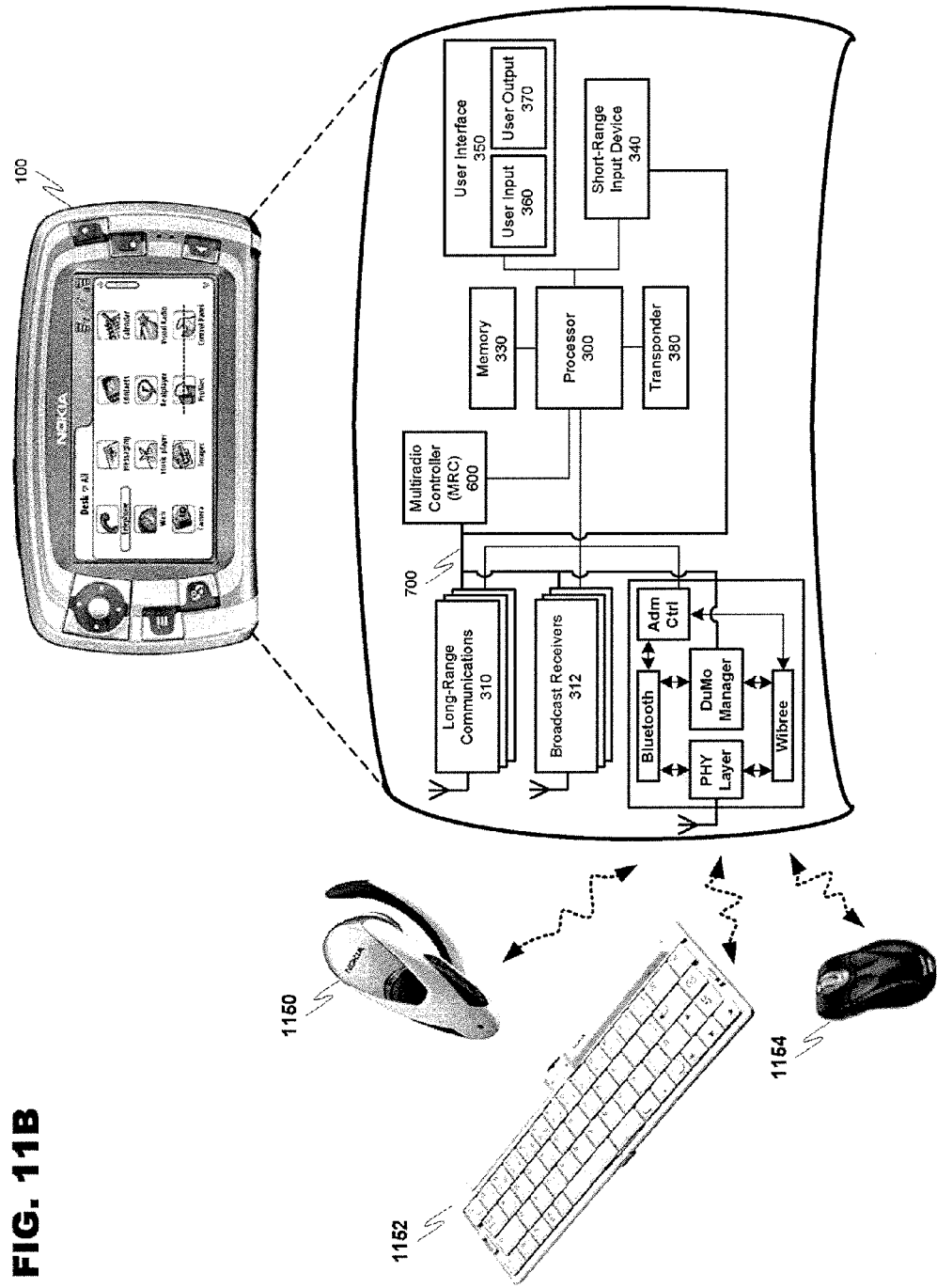
FIG. 11B discloses an example of multiple wireless peripheral devices attempting to communicate concurrently with a dual-mode radio modem including operational enhancements in accordance with at least one embodiment of the present invention.

FIG. 11B includes an exemplary implementation of at least one embodiment of the present invention. Again, in this example the three previous peripheral devices are attempting concurrent communication with WCD 100 through dual-mode radio modem 1100. However, radio modem 1100 may now include local control resources for managing both "radios" (e.g., software based radio control stacks) attempting to use the physical layer (PHY) resources of dual-mode radio modem 1100. In this example, dual-mode radio modem 1100 includes at least two radio stacks or radio protocols (labeled "Bluetooth" and "Wibree") that may share the PHY layer resources (e.g., hardware resources, antenna, etc.) of dual-mode radio modem 1100. The local control resources may include an admission controller ("Adm Ctrl") and a dual-mode controller (DuMo Manager). These local control resources may be embodied as a software program and/or in a hardware form (e.g., logic device, gate array, MCM, ASIC, etc.) in a dual-mode radio modem interface, and the radio modem interface may be coupled to, or alternatively, embedded in dual-mode radio modem 1100. The interaction of these control resources with the radio protocols utilizing dual-mode radio modem 1100 is explained below.

Figure 12A:
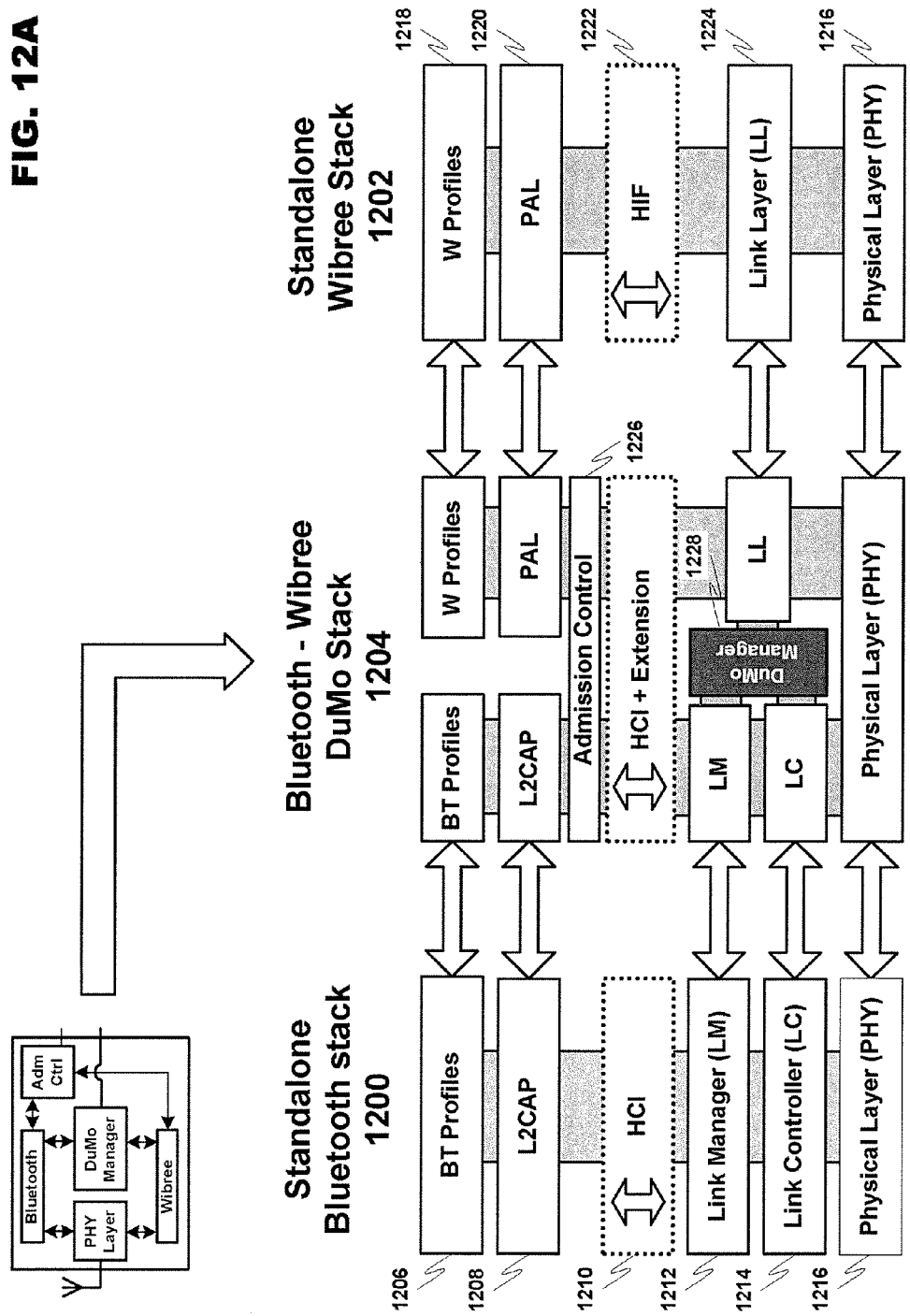
FIG. 12A discloses further detail regarding the example of FIG. 11B regarding operational enhancements for managing the operation of a dual-mode modem in accordance with at least one embodiment of the present invention.

With respect to FIG. 12A, an exemplary combination of two separate radio protocol stacks into a single combined entity controlled locally by at least an admission control 1226 and a DuMo manager 1228 is now disclosed. Initially, two example standalone stacks are shown to establish the individual elements that may be incorporated into an integrated dual-mode entity. Standalone Bluetooth™ stack 1200 includes elements that may convey information from a system level to a physical layer where it may be transmitted wireless to another device. At the top level, BT Profiles 1206 include at least a description of a known peripheral device which may be connected wirelessly to WCD 100, or an application that may utilize Bluetooth™ in order to engage in wireless communication with a peripheral device. Bluetooth™ profiles of other devices may be established through a pairing procedure wherein identification and connection information for a peripheral device may be received by WCD 100 through a polling process and then saved in order to expedite the connection to the device at a later time. After the application and/or target peripheral device (or devices) is established, any information to be sent must be prepared for transmission. L2CAP level 1208 includes at least a logical link controller and adaptation protocol. This protocol supports higher level protocol multiplexing packet segmentation and reassembly, and the conveying of quality of service information. The information prepared by L2CAP level 1208 may then be passed to an application-optional host controller interface (HCI) 1210. This layer may provide a command interface to the lower link manager protocol (LMP) layers, link manager (LM) 1212 and link controller (LC) 1214. LM 1212 may establish the link setup, authentication, link configuration and other protocols related to establishing a wireless link between two or more devices. Further, LC 1214 may manage active links between two or more devices by handling low-level baseband protocols. Wireless communication may then be established and conducted using the hardware (modem, antenna, etc.) making up physical layer (PHY) 1216. Of course, the above identified layers of Bluetooth™ stack 1200 may also be utilized in an order reversed from that disclosed above in order to receive a wireless transmission into WCD 100 from a peripheral device.

The layers in the standalone Wibree™ stack are similar to the elements previously described. However, due to the relative simplicity of Wibree™ when compared to Bluetooth™ there are actually less layers utilized to achieve wireless communication. W Profiles 1218, similar to the profiles used in Bluetooth™, are used to specify applications that may use Wibree™ for communication and peripheral devices with which a Wibree™ modem may wirelessly communicate. The profile adoption layer (PAL) 1220 may be used to prepare the information for transmission via wireless communication. HIF layer 1222 may provide an interface between the upper layers communicating with applications and schedulers in WCD 100, and the lower layers of the Wibree™ stack which establish and maintain the links to peripheral devices. Lower layers of the Wibree™ stack may further include at least link layer (LL) 1224. LL 1224 may both establish and maintain wireless communications with other wireless enabled devices through the use of Physical Layer (PHY) 1216, which is common to Bluetooth™ and Wibree™ radio protocols using dual-mode modem 1100. Wibree™ LL 1224, however, differs significantly from LM 1211 and LC 1214 in Bluetooth™, and as a result, may have a substantial effect on the functioning of DuMo manager 1228.

The central stack in FIG. 12A is an exemplary combined Bluetooth™ and Wibree™ DuMo Stack 1204 usable for managing communication in a dual-mode radio modem 1100. In this example, the elements previously described for both Bluetooth™ stack 1200 and Wibree™ stack 1202 are shown combined in a parallel structure linked by admission control 1226 and DuMo manager 1228. Admission control 1226 may act as a gateway for the dual-mode radio modem 1100 by filtering out both Bluetooth™ and Wibree™ requests from the operating system of WCD 100 that may result in conflicts. Scheduling information may also be provided by MRC 600, wherein certain periods of operation are allocated to dual-mode radio modem 1100 in view of the other active radio modems operating in WCD 100. This scheduling information may be passed down to both the HCI+Extension level of the combined protocol stacks and also to DuMo manager 1228 for further processing. However, if scheduling information from MRC 600 is critical (delay-sensitive), it may be sent through MCS 700 via a direct connection to DuMo Manager 1228. The information received by DuMo manager, and the processing involved in managing the operation of the radio protocols, is discussed below with regard to FIG. 12B.

Figure 12B:
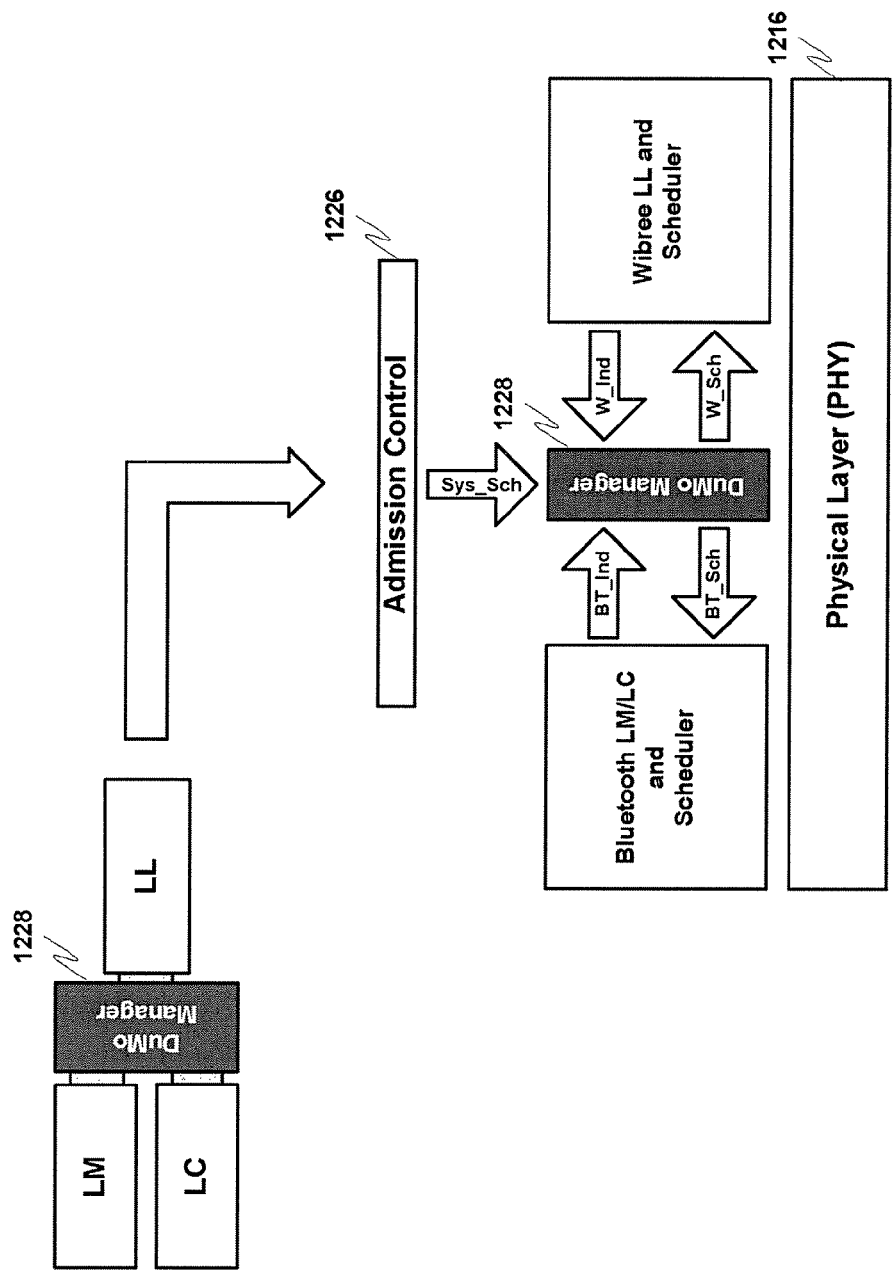
FIG. 12B discloses further detail regarding the example of FIG. 12A regarding information flow in operational enhancements for managing the operation of a dual-mode modem in accordance with at least one embodiment of the present invention.

FIG. 12B discloses in more detail an exemplary DuMo manager 1228 in accordance with at least one embodiment of the present invention. DuMo manager may receive information used in the determination of a "revised" schedule or sub-schedule for radio protocols utilizing the PHY layer 1216 of dual-mode modem 1100 (given that there may already be a schedule for the dual-mode radio modem 1100 in view of other radio modems 610 as created by MRC 600). Some information received by DuMo manager 1228 may come through upper layers, such as through admission control 1226. This information may include at least scheduling information (Sys_Sch) for the dual-mode modem 1100 as compared to other active radio modems 610 in WCD 100 (per MRC 600). As previously stated above, the urgency involved with delay-sensitive information, including some scheduling information, may require it to be delivered from MRC 600 directly to DuMo manager 1228 via MCS 700. Other information may include indication information from the Bluetooth™ radio stack (BT_Ind) and indication information from the Wibree™ radio stack (W_Ind) of the current state of each radio protocol. Indication information may include the current state of the modem with regard to each radio protocol (e.g., whether the dual-mode radio modem 1100 is actively receiving information or transmitting information from a certain protocol), whether there is information queued to send for either protocol, the urgency of the information to send for each protocol, etc. This indication information is used by DuMo manager 1228 to determine scheduling (e.g., BT_Sch and W_Sch) for the individual radios of the dual-mode modem so that dual-mode radio modem 1100 may share time between various protocols without experiencing communication errors. In making these scheduling decisions, DuMo manager 1228 must operate in accordance with the orders, parameters and/or instructions given by admission control 1226.

X. WCD Modes of Operation in a Low-Power Network Such as Wibree™

FIG. 13A discloses an exemplary communication scenario wherein wireless networks have been established between at least three devices. In this example, WCD 100 may actually be participating in two networks at once. WCD 100 may be the master of both a Bluetooth™ network with slave device 1302 and the master of a low-power network, such as Wibree™, including low-power device 1304. Device 1304 may be, for example, a wristwatch including resources for wireless communication. In this configuration, since WCD 100 is the master of both the Bluetooth™ and low-power networks, WCD 100 may be able to manage the communications of one or more radio modules 610 in order to avoid message conflicts. More specifically, since both device 1302 and 1304 are operating in accordance with parameters established by WCD 100, WCD 100 may alter these operational parameters when needed in order to optimize communication. The management strategy employed by WCD 100 may include any or all of the control systems and/or methods previously described in this disclosure.

Now referring to FIG. 13B, a more problematic scenario is disclosed. Again at least two networks exist between at least three devices. However the low-power device is already the master of a network of low-power devices including one or more slave devices 1306. To expound on the previous example, low-power device 1304 may be a "smart" wristwatch enabled to communicate wirelessly over a low-power communication medium like Wibree™. This device may be wirelessly coupled to other devices like a pulse monitor, blood pressure monitor, glucose monitor, pedometer, thermometer, etc. In this case, the wristwatch, acting as master, may poll these other sensory devices in order to gather physiological information about the wearer. Regardless, the wristwatch could actually be coupled to any device capable of wireless communication including a cellular telephone, headset, MP3 player, headset, etc.

For some emerging low-power networks like Wibree™, the ability for a device to act as a slave in one network and a master in another network is not yet available. In addition, behaving in this manner (e.g., "Scatternetting") may never be available in some low-power devices due to space and/or power considerations. For example, if device 1304 was indeed the size of a wristwatch, space limitations may not allow for the processing resources necessary to support Scatternetting. Therefore, a situation as depicted in FIG. 13B may then exist wherein WCD 100 is forced to operate as a slave connected to low-power device 1304 while also being a master to Bluetooth™ device 1302. It may also be possible for WCD 100 to act as a slave to Bluetooth™ device 1302, although a WCD slave/slave configuration is not shown in FIG. 13B. Operating in a slave mode may limit how WCD 100 may regulate the operation of one or more modems operating substantially simultaneously. This limitation may occur because WCD 100 can no longer alter network timing as needed. Instead, it must somehow operate flexibly under the timing parameters established by low-power device 1304 and/or Bluetooth™ device 1302.

XI. Communication Management Strategies for a WCD Connected in a Slave Mode

Starting with FIG. 14A, the present disclosure refers exclusively to Wibree™ when discussing aspects of the present invention related to a low-power communication medium. The specific use of Wibree™ is not intended to be limiting, as the present invention may be applicable to any similar wireless communication medium. Wibree™ is simply utilized for the sake of simplifying the explanation of at least one embodiment of the present invention.

FIG. 14A discloses exemplary communication activity for a radio module employing Wibree™ communication. In this example, a master device polls a slave device in the network. The master poll, which represented by "P" 1400, occurs at a regular interval. This interval is the master polling interval, and may be established by master device 1304 and transmitted to various slaves (e.g., WCD 100) when the network connection is first formed. A slave may respond to poll 1400 with a response message 1492, represented as "R" 1402 in FIG. 14A. In symmetric communication every poll by the master 1304 must be responded to in order to maintain the network connection. However, Wibree™ may operate in an asynchronous mode. In asynchronous communication, every master poll 1400 does not require a slave response 1402. However, some maximum period of time between responses must then be necessary in order to determine whether a slave is still participating in the network and is able to receive information transmitted by low-power master 1304. This maximum period of time between responses, or slave latency period, may be established by low-power master 1304 and may further be influenced by a slave device or an application, for example, executing on one or more of the devices in the wireless network. A slave, such as WCD 100, must respond at least as frequently as the slave latency period specifies in order to participate in the network. The slave latency period may be established, for example, as number of unanswered master polls 1400 between each slave response 1402. In FIG. 14A, a slave must respond to master poll at least within a maximum period of time of five master polls.

However, if the slave responds before the slave latency period is about to expire, then the slave latency period may be forced to reset. An exemplary reset scenario is disclosed in FIG. 14B. In this example, the slave (e.g., WCD 100) responds at master polling interval 1404, two intervals before the current slave latency period would have expired. As a result, the existing slave latency period is cut off, and the slave latency period is reset starting from the slave response at 1404. In this way, a slave may affect when the slave latency period will expire, and further, may influence how master device 1304 maintains the wireless network.

FIG. 14C introduces a second active radio module 610 into consideration when WCD 100 is already acting as a slave to low-power device 1304. In this example, both Bluetooth™ activity for a first radio module in WCD 100 and Wibree™ activity for a second radio module are shown. Bluetooth™ communication may be composed of both Asynchronous Connectionless Links (ACL), often used to establish a network connection, and Synchronous Connection Oriented Links (SCO) for scheduled communication. A SCO link reserves slots between the master and the slave and can therefore be considered to provide a circuit switched connection. SCO is usually used to support time critical information (e.g. voice packets), and therefore, SCO packets are never retransmitted. eSCO is a modification of traditional SCO communication that allows limited retransmission of message packets in a short timeframe.

The Bluetooth™ activity depicted in the example of FIG. 14C is a SCO link. As a result, these packets cannot be retransmitted, which may result which in an elevated priority level for this wireless communication medium in view of any perceived interference situations. Other communication mediums that are able to be rescheduled may be managed in order to avoid message collisions. In this situation, at least three communication collisions may exist at 1406, 1408 and 1410. These potential packet collisions may be predicted using at least operational schedule information provided by MRC 600 in conjunction with communication parameters established by low-power master 1304. Without some sort of avoidance control, the radio modules operating using these wireless communication mediums would experience interference at 1406, 1408 and 1410, resulting in a degradation of communication performance for WCD 100.

In the case of a conflict, the slave device, in this case WCD 100, may attempt to negotiate a new master polling interval and/or slave latency period with the low-power master 1304. This may include, for example, the sending of a reschedule request in the PAL layer. This request may include a priority level, for example, high priority due to dual-mode radio module operation. If the request is accepted, the low-power master 1304 may respond with a link layer control command message to all slave informing them of the altered timing parameters.

If low-power master 1304 cannot alter the communications parameters in response to a request from a slave device, an alternative solution for operating within the established parameters and avoiding communication conflicts is presented in FIG. 14D. Using the aforementioned ability to respond earlier during the slave latency period, WCD 100 may alter the predicted communication pattern in the Wibree™ network to avoid the schedule Bluetooth™ communication. Initially, since the Wibree™ master polling packets at 1406 and 1410 are not critical (e.g., it is not the last polling packet in the slave latency period) it may be cancelled in favor of the Bluetooth™ SCO communication. However, the polling packet at 1408 would have been in line with the original slave latency period. If this Wibree™ packet were cancelled, the slave latency period would expire without a response from the slave. As a result, some data may not be delivered to the slave in time (within the slave latency period), or possibly the slave may be dropped from the network altogether. However, a strategy in accordance with the present invention may be employed to prevent disconnection. Instead of waiting until the last possible master polling interval to respond, slave WCD 100 may respond in the last available period before the conflict would occur. In FIG. 14D this interval occurs at 1412. As a result, the existing slave latency period would be cut off and a new slave latency period may begin at 1412.

FIG. 15A discloses a further example of at least three different active radio modules 610 communicating substantially simultaneously. In this example, WLAN has been designated the highest priority wireless medium. This priority may be based on an optimization strategy due to an inability to reschedule WLAN packets, a high priority application utilizing WLAN communication, or may be designated by other methods such as a manual configuration on WCD 100. As shown in FIG. 15A, potential conflicts may exist at 1500, 1502, 1504 and 1506. These conflicts may exist between any two wireless communication mediums or all three mediums. Communications in radio modules 610, including a radio module 610 that is acting in a dual-mode for both Bluetooth™ and Wibree™ must be managed in order to avoid conflicts.

Now referring to FIG. 15B, communication management in accordance with at least one embodiment of the present invention is disclosed. WLAN has been given the highest priority, so the predicted conflict at 1500 may be avoided by canceling the Bluetooth™ packet. For the conflict predicted at 1502, the Wibree™ slave response may be issued earlier than the current slave latency period, which cuts off the existing period and resets the new slave latency period starting at 1508. Further, the Wibree™ poll packet may be canceled to avoid a conflict at 1504. There is no reason to elevate the priority for this transmission because this polling packet does not unavoidably fall on the slave latency period. Finally, both the conflicting Bluetooth™ and Wibree™ packets at 1506 may be canceled since WLAN has the highest priority.

16A discloses the identical problematic situation with respect to FIG. 15A, however, in this case Bluetooth™ is utilizing eSCO packets for communication. Therefore, in FIG. 15B, some rescheduling of Bluetooth™ packets is available to alleviate communication problems. At 1600 and 1604, the Bluetooth™ packet may be retransmitted to avoid a potential communication conflict with the WLAN activity also planned for this instant. However, since the WLAN communication is planned and is higher priority, the Wibree™ transaction must be rescheduled to a previous master polling interval. However, the master poll 1400 predicted to be conflicting at 1602 may now proceed since the Bluetooth™ eSCO packet may be retransmitted. As in the previous example, the preemptive transmission of the slave response packet 1402 may cause the existing slave latency period to be cut-off, and a new slave latency period to be reset.

It is further important to note that the previously described strategy may be adjusted depending on variables such as the current state or selected mode of WCD 100. For example, if the operational schedule in WCD 100 is currently unclear (e.g., applications are starting and/or stopping) or if maximum communication performance is desired over energy efficiency, then Wibree™ radio module 610 may continually respond to all polls issued by low-power master 1304 that do not overlap with other higher priority activities. Multiple advantages may be achieved by employing this strategy. Always replying to any poll will continually force the slave latency period to reset, giving WCD 100, when operating as a slave, the most flexibility in balancing Wibree™ with other active wireless communication mediums. For example, if the operational schedule for WCD 100 is unclear, having Wibree™ radio module 610 respond to every poll will provide the longest slave latency period possible when the operational schedule is ultimately determined. Further, responding to every poll will increase the overall amount of communication between devices on the Wibree™ network, which may result in increased data throughput. However, a disadvantage may be seen in increased energy usage by Wibree™ radio module 610. Again, a user or automated control may have to consider the more important need and set the operation of WCD 100 accordingly.

XII. Power Savings Realized Through Slave Response Adjustment

The operation of radio module 610 may in some instances cause various supporting components to be activated in WCD 100. For example, the initiation of a transaction for certain wireless communication mediums may cause a fast oscillator to be activated in WCD 100. FIG. 17A discloses an example wherein the fast oscillator is started in preparation for the transmission of a Wibree™ packet such as slave response 1402. When MRC 600 or another control entity in WCD 100 decides that the packet should be sent, the fast oscillator is started at 1700, which is followed closely by the transmission of slave response packet 1402 at 1702.

However, Wibree™ is not the only wireless communication medium that might utilize the fast oscillator in WCD 100. Another radio module communicating using, for example, GSM activity may also trigger the start of this communication support component. Each time the oscillator is started, power is expended in WCD 100. In this situation, WCD 100 may realize a power savings if other radio modules that may utilize the radio oscillator take advantage of it already being active instead of allowing it to deactivate only to immediately request the fast oscillator to restart again. FIG. 17B shows an example of radio module 610 utilizing Wibree™ detecting the fast oscillator is active at 1704. If no other conflicts exist, WCD 100 may respond to low-power master 1304 by sending a preemptive slave response 1402 at 1706 in order to take advantage of the already activated fast oscillator. The preemptive transmission of the slave response packet 1402 may cause the existing slave latency period to be cut-off, and a new slave latency period to be reset. Further, radio module 610 using an already active fast oscillator may conserve power in WCD 100 because a separate activation for the fast oscillator in accordance with each existing slave latency period response may be avoided. Further, if another resource in WCD 100 is required to regularly activate the fast oscillator, then Wibree™ slave responses 1402 may be aligned to the timing of the other resource to save power.

Figure 18:
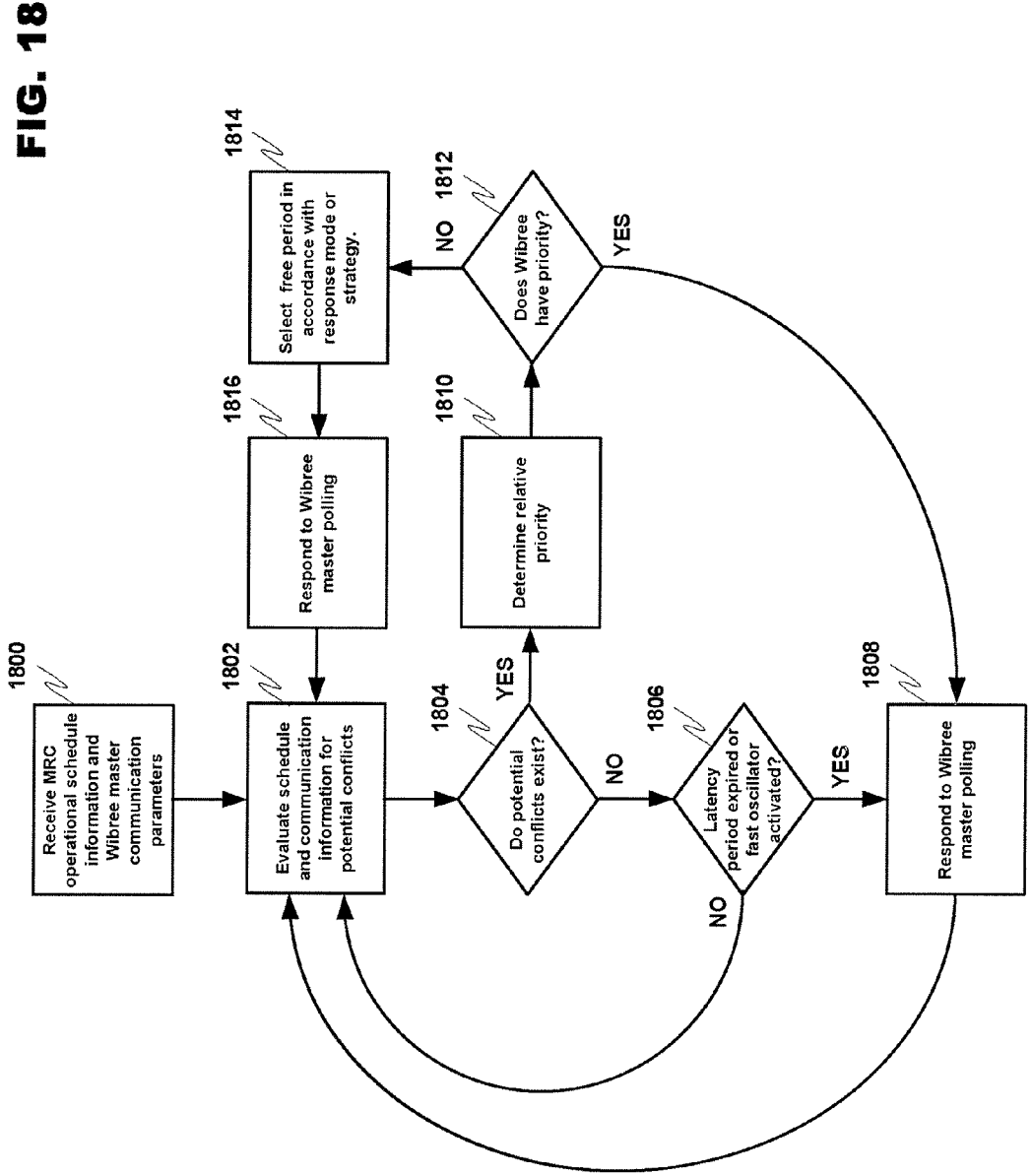
FIG. 18 discloses an exemplary flow chart of a process for managing the operation of a wireless communication device including plurality of radio modules wherein at least one of the radio modules is utilizing a low-power communication medium in accordance with at least one embodiment of the present invention.

FIG. 18 discloses a flowchart for a process in which a slave WCD 100 may determine when to transmit a slave response message 1402 in accordance with at least one embodiment of the present invention. The process may begin in step 1800 wherein information may be received including at least an MRC operational schedule from MRC 600 and Wibree™ communication parameters from low-power master device 1304. The received information may then be utilized in step 1802 to determine if any potential conflicts exist between active radio modules 610 in WCD 100. In no conflicts exist in step 1804, then a further determination may be made in step 1806 as to whether the slave latency period has expired or a communication support component like the fast oscillator has been activated. If either of these conditions are true, then slave response 1402 may be transmitted in step 1808. If neither of the conditions determined in step 1806 have been satisfied, then the process may restart from step 1802.

Alternatively, if potential communication conflicts do exist in step 1804, a process to adjust the slave response 1402 may be initiated. In step 1810 the relative priority between communication mediums may be determined. This priority may include a determination as to whether possibly conflicting mediums may retransmit conflicting packets, whether a priority has been set in a particular medium due to the activation of a particular application on WCD 100 or by manual user setting, or possibly due to a slave latency cutoff period about to expire. If, as a result of this analysis, Wibree™ has priority over the other conflicting wireless communication mediums, then in step 1212 a Wibree™ radio module 610 may be instructed to send a slave response 1402 (step 1808) and then return to step 1802 to begin the process for the next slave response message. Otherwise, if Wibree™ is not the communication medium with the highest priority, a Wibree™ radio module 610 may in step 1814 select an available master polling interval in accordance with any response mode or strategy (e.g., power-conservation vs. high throughput efficiency) and before the latency period expires to send a slave response 1402 (step 1816). This preemptive response may both cut off the existing slave latency period and reset a new slave latency period in low-power master 1304.

Figure 19:
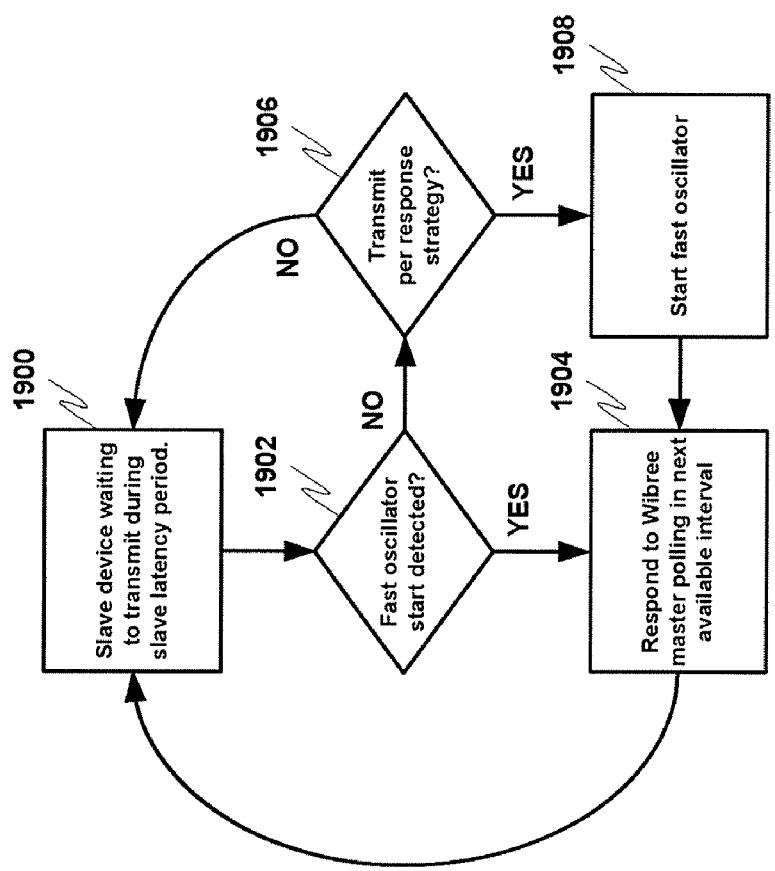
FIG. 19 discloses another exemplary flow chart of a process for managing the operation of a wireless communication device including plurality of radio modules wherein at least one of the radio modules is utilizing a low-power communication medium in accordance with at least one embodiment of the present invention.

FIG. 19 discloses another exemplary process in accordance with at least one embodiment of the present invention. More specifically, the process of FIG. 19 relates to the operation of a fast oscillator or other similar communication support component. If in step 1900 slave WCD 100 is in the midst of a slave latency period, a determination may be made in step 1902 as to whether the fast oscillator has been started. If the start of the fast oscillator has been detected, then in step 1904 the slave response 1402 may be sent in the next available master polling interval and then the process may restart at step 1900. However, if the fast oscillator has not been started, then in step 1906 a determination may be made as to whether it is appropriate for slave WCD 100 to send a slave response 1402. The determination of step 1906 may be made in accordance with any of the control strategies previously disclosed herein. If it is appropriate to send slave response 1402, the fast oscillator may be started in step 1908 before the slave response 1402 is sent in the next available master polling interval (step 1904). The process may then go to step 1900 to continue determination of when to send the next slave response 1402.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
    participating in a wireless short-range communication network including at least one wireless communication device operating as a master;
    receiving information indicating a master device polling interval and a maximum period of time for response in order to maintain connectivity to the wireless short-range communication network;
    computing schedule information based on one or more of information received via the wireless short-range communication network or information available locally to a radio module, the schedule information indicating one or more time periods during which a the radio module communicating in the wireless short-range communication network is allowed to communicate; and
    determining a time to respond to a master device poll in order to maintain connectivity to the short-range communication network, wherein the time to respond is scheduled before the maximum period of time for response when a communication conflict involving the radio module is predicted to occur, based on the schedule information, at the maximum period of time for response.

2. The method of claim 1, wherein the short range wireless network includes a wireless, low-power, asynchronous link with the at least one master device.

3. The method of claim 1, wherein the schedule information indicating one or more time periods during which the radio module communicating in the wireless short-range communication network is allowed to communicate is calculated based on activities of a plurality of radio modules that are managed by a multiradio controller.

4. The method of claim 3, wherein at least one radio module of the plurality of radio modules is enabled to operate in a dual mode by communicating using two different wireless communication mediums at substantially the same time.

5. The method of claim 3, wherein determining the time to respond to the master device poll in order to maintain connectivity to the short-range communication network includes determining a relative priority between the plurality of radio modules.

6. The method of claim 5, wherein priority is given to the radio module communicating in the wireless short-range communication network when the maximum period of time for response in order to maintain connectivity to the short-range communication network is expiring.

7. The method of claim 5, wherein priority is given to the radio module communicating in the wireless short-range communication network when the maximum period of time for response in order to maintain connectivity to the short-range communication network is about to expire and communications for other conflicting radio modules can be rescheduled.

8. The method of claim 1, wherein a conflict between the radio modules predicted to occur at the maximum period of time for response causes the radio module communicating in the wireless short-range communication network to respond before the maximum period of time for response in order to maintain connectivity to the short-range communication network.

9. The method of claim 1, wherein the radio module communicating in the wireless short-range communication network is configured to respond to the last non-conflicting master device polling interval occurring before the maximum period of time for response in order to maintain connectivity to the short-range communication network.

10. The method of claim 1, wherein the radio module communicating in the wireless short-range communication network is configured to respond to a non-conflicting master device poll after a communication support component is started in the wireless communication device.

11. The method of claim 1, wherein the radio module communicating in the wireless short-range communication network is configured to respond to any non-conflicting master device poll.

12. A computer program product comprising computer executable program code recorded on a non-transitory computer readable storage medium, the computer program code comprising:
   code configured to cause an apparatus to participate in a wireless short-range communication network including at least one wireless communication device operating as a master;
   code configured to cause an apparatus to receive information indicating a master device polling interval and a maximum period of time for response in order to maintain connectivity to the wireless short-range communication network;
   code configured to cause an apparatus to compute schedule information based on one or more of information received via the wireless short-range communication network or information available locally to a radio module, the schedule information indicating one or more time periods during which the radio module communicating in the wireless short-range communication network is allowed to communicate; and
   code configured to cause an apparatus to determine a time to respond to a master device poll in order to maintain connectivity to the short-range communication network, wherein the time to respond is scheduled before the maximum period of time for response when a communication conflict involving the radio module is predicted to occur, based on the schedule information, at the maximum period of time for response.

13. The computer program product of claim 12, wherein the short range wireless network includes a wireless, low-power, asynchronous link with the at least one master device.

14. The computer program product of claim 12, wherein the schedule information indicating one or more time periods during which the radio module communicating in the wireless short-range communication network is allowed to communicate is calculated based on activities of a plurality of radio modules that are managed by a multiradio controller.

15. The computer program product of claim 14, wherein at least one radio module of the plurality of radio modules is enabled to operate in a dual mode by communicating using two different wireless communication mediums at substantially the same time.

16. The computer program product of claim 14, wherein determining the time to respond to the master device poll in order to maintain connectivity to the short-range communication network includes determining a relative priority between the plurality of radio modules.

17. The computer program product of claim 16, wherein priority is given to the radio module communicating in the wireless short-range communication network when the maximum period of time for response in order to maintain connectivity to the short-range communication network is expiring.

18. The computer program product of claim 16, wherein priority is given to the radio module communicating in the wireless short-range communication network when the maximum period of time for response in order to maintain connectivity to the short-range communication network is about to expire and communications for other conflicting radio modules can be rescheduled.

19. The computer program product of claim 12, wherein a conflict between the radio modules predicted to occur at the maximum period of time for response causes the radio module communicating in the wireless short-range communication network to respond before the maximum period of time for response in order to maintain connectivity to the short-range communication network.

20. The computer program product of claim 12, wherein the radio module communicating in the wireless short-range communication network is configured to respond to the last non-conflicting master device polling interval occurring before the maximum period of time for response in order to maintain connectivity to the short-range communication network.

21. The computer program product of claim 12, wherein the radio module communicating in the wireless short-range communication network is configured to respond to a non-conflicting master device poll after a communication support component is started in the wireless communication device.

22. The computer program product of claim 12, wherein the radio module communicating in the wireless short-range communication network is configured to respond to any non-conflicting master device poll.

23. A device comprising:
at least one processor; and
at least one memory including computer program code, the at least one memory and the computer program code configured to, with the at least one processor, cause the apparatus at least to:
participate in a wireless short-range communication network including at least one wireless communication device operating as a master;
receive information indicating a master device polling interval and a maximum period of time for response in order to maintain connectivity to the wireless short-range communication network;
compute schedule information based on one or more of information received via the wireless short-range communication network or information available locally to a radio module, the schedule information indicating one or more time periods during which the radio module communicating in the wireless short-range communication network is allowed to communicate; and
determine a time to respond to a master device poll in order to maintain connectivity to the short-range communication network, wherein the time to respond is scheduled before the maximum period of time for response when a communication conflict involving the radio module is predicted to occur, based on the schedule information, at the maximum period of time for response.

24. The device of claim 23, wherein the short range wireless network includes a wireless, low-power, asynchronous link with the at least one master device.

25. The device of claim 23, wherein the schedule information indicating one or more time periods during which the radio module communicating in the wireless short-range communication network is allowed to communicate is calculated based on activities of a plurality of radio modules that are managed by a multiradio controller.

26. The device of claim 25, wherein at least one radio module of the plurality of radio modules is enabled to operate in a dual mode by communicating using two different wireless communication mediums at substantially the same time.

27. The device of claim 25, wherein determining the time to respond to the master device poll in order to maintain connectivity to the short-range communication network includes determining a relative priority between the plurality of radio modules.

28. The device of claim 27, wherein priority is given to the radio module communicating in the wireless short-range communication network when the maximum period of time for response in order to maintain connectivity to the short-range communication network is expiring.

29. The device of claim 27, wherein priority is given to the radio module communicating in the wireless short-range communication network when the maximum period of time for response in order to maintain connectivity to the short-range communication network is about to expire and communications for other conflicting radio modules can be rescheduled.

30. The device of claim 23, wherein a conflict between the radio modules predicted to occur at the maximum period of time for response causes the radio module communicating in the wireless short-range communication network to respond before the maximum period of time for response in order to maintain connectivity to the short-range communication network.

31. The device of claim 23, wherein the radio module communicating in the wireless short-range communication network is configured to respond to the last non-conflicting master device polling interval occurring before the maximum period of time for response in order to maintain connectivity to the short-range communication network.

32. The device of claim 23, wherein the radio module communicating in the wireless short-range communication network is configured to respond to a non-conflicting master device poll after a communication support component is started in the wireless communication device.

33. The device of claim 23, wherein the radio module communicating in the wireless short-range communication network is configured to respond to any non-conflicting master device poll.

34. A device, comprising:
means for participating in a wireless short-range communication network including at least one wireless communication device operating as a master;
means for receiving information indicating a master device polling interval and a maximum period of time for response in order to maintain connectivity to the wireless short-range communication network;
means for computing schedule information based on one or more of information received via the wireless short-range communication network or information available locally to a radio module, the schedule information indicating one or more time periods during which the radio module communicating in the wireless short-range communication network is allowed to communicate; and
means for determining a time to respond to a master device poll in order to maintain connectivity to the short-range communication network, wherein the time to respond is scheduled before the maximum period of time for response when a communication conflict involving the radio module is predicted to occur, based on the schedule information, at the maximum period of time for response.

35. A system, comprising:
a master device enabled to form a wireless network; and
at least one slave wireless communication device, the at least one slave device including a plurality or radio modules coupled to a multiradio controller;
the master device forming a wireless short-range communication network including the at least one slave wireless communication device, the at least one wireless communication device receiving information indicating a master device polling interval and a maximum period of time for response in order to maintain connectivity to the short-range communication network from the master device;
the at least one slave device further receiving schedule information indicating one or more time periods during which a radio module in the at least one wireless communication device is allowed to communicate and determining a time to respond to a master device poll issued by the master device in order to maintain connectivity to the short-range communication network, wherein the time to respond is scheduled before the maximum period of time for response when a communication conflict involving the radio module is predicted to occur, based on the schedule information, at the maximum period of time for response.

36. A radio module, comprising:
a radio modem; and
a local controller coupled to the radio modem, the local controller enabled to perform method steps including:

participating in a wireless short-range communication network including at least one wireless communication device operating as a master;

receiving information indicating a master device polling interval and a maximum period of time for response in order to maintain connectivity to the wireless short-range communication network;

computing schedule information based on one or more of information received via the wireless short-range communication network or information available locally to a radio module, the schedule information indicating one or more time periods during which the radio module communicating in the wireless short-range communication network is allowed to communicate; and determining a time to respond to a master device poll in order to maintain connectivity to the short-range communication network, wherein the time to respond is scheduled before the maximum period of time for response when a communication conflict involving the radio module is predicted to occur, based on the schedule information, at the maximum period of time for response.

37. The radio module of claim 36, wherein the radio module is further enabled to operate in a dual mode by communicating using two different wireless communication mediums at substantially the same time.

38. The radio module of claim 37, wherein the radio module is enabled to communicate via the Bluetooth™ and the Wibree™ wireless communication mediums at substantially the same time.

* * * * *